US008300137B2

(12) United States Patent
Ogino

(10) Patent No.: US 8,300,137 B2
(45) Date of Patent: Oct. 30, 2012

(54) IMAGE SENSING APPARATUS PROVIDING DRIVING DIRECTION OF FOCUS LENS FOR ATTAINING IN-FOCUS STATE AND CONTROL METHOD THEREFOR

(75) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/651,904

(22) Filed: Jan. 4, 2010

(65) Prior Publication Data

US 2010/0171871 A1  Jul. 8, 2010

(30) Foreign Application Priority Data

Jan. 7, 2009  (JP) ................................ 2009-001825

(51) Int. Cl.
*H04N 5/232* (2006.01)
*G03B 13/00* (2006.01)
*H04N 5/222* (2006.01)
(52) U.S. Cl. ..................... 348/346; 348/345; 348/333.02
(58) Field of Classification Search .......... 348/345–356, 348/333.01–333.02
See application file for complete search history.

(56) References Cited

U.S. PATENT DOCUMENTS

| 5,506,654 | A | 4/1996 | Kim | |
|---|---|---|---|---|
| 6,701,075 | B2* | 3/2004 | Ogino | 396/101 |
| 8,004,598 | B2* | 8/2011 | Tsuchiya | 348/346 |
| 2001/0045989 | A1* | 11/2001 | Onuki | 348/345 |
| 2004/0036792 | A1* | 2/2004 | Moriya et al. | 348/345 |
| 2004/0165085 | A1* | 8/2004 | Shibutani | 348/231.3 |
| 2005/0057677 | A1* | 3/2005 | Hagiwara et al. | 348/333.01 |
| 2007/0195189 | A1* | 8/2007 | Kimoto | 348/345 |
| 2009/0102960 | A1* | 4/2009 | Tsuchiya | 348/345 |

FOREIGN PATENT DOCUMENTS

| JP | 06-319073 | | 11/1994 |
|---|---|---|---|
| JP | 2002-072332 | A | 3/2002 |
| JP | 2003-264734 | A | 9/2003 |
| JP | 2004-023747 | A | 1/2004 |
| JP | 2005-140943 | A | 6/2005 |
| JP | 2008-216503 | A | 9/2008 |

OTHER PUBLICATIONS

The above references were cited in a Jun. 4, 2012 Japanese Office Action, which is enclosed without an English Translation, that issued in Japanese Patent Application No. 2009-001825.

* cited by examiner

*Primary Examiner* — Kelly L Jerabek
(74) *Attorney, Agent, or Firm* — Cowan, Liebowitz & Latman, P.C.

(57) ABSTRACT

In an image sensing apparatus including an image sensing unit with an image sensor and an EVF, first image signals obtained every preset number of frames, of image signals output from the image sensing unit are displayed on the EVF, focus evaluation values indicating a focus state of an image are obtained from second image signals obtained in frames other than the frames for the first image signals of the image signals output from the image sensing unit, a direction of driving a focus lens for an in-focus state is determined on the basis of the obtained focus evaluation values, and the determined driving direction is displayed on the EVF. Further, the focus lens is moved for image sensing in the frames for the second image signals to carry out image sensing of the subject at different focus lens positions for each frame.

14 Claims, 20 Drawing Sheets

F I G. 10
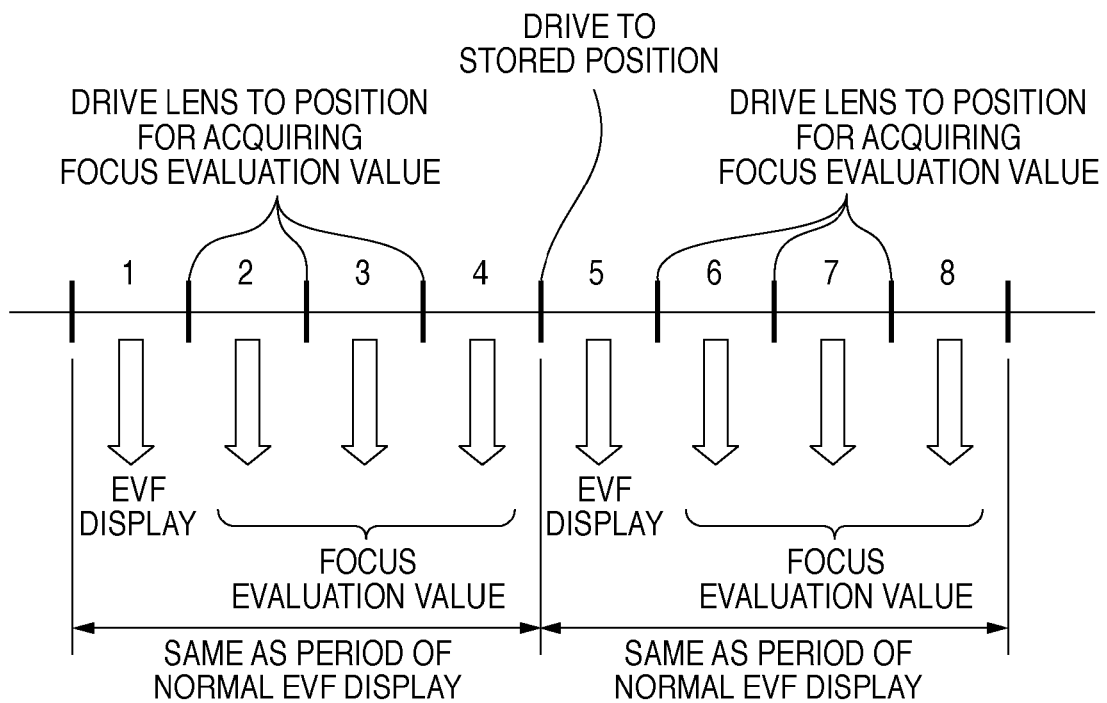
F I G. 11
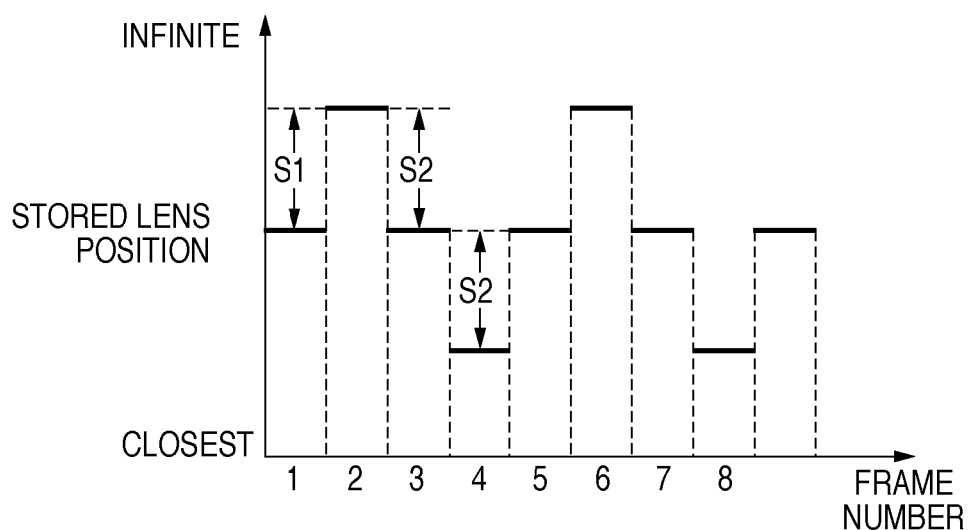

F I G. 15
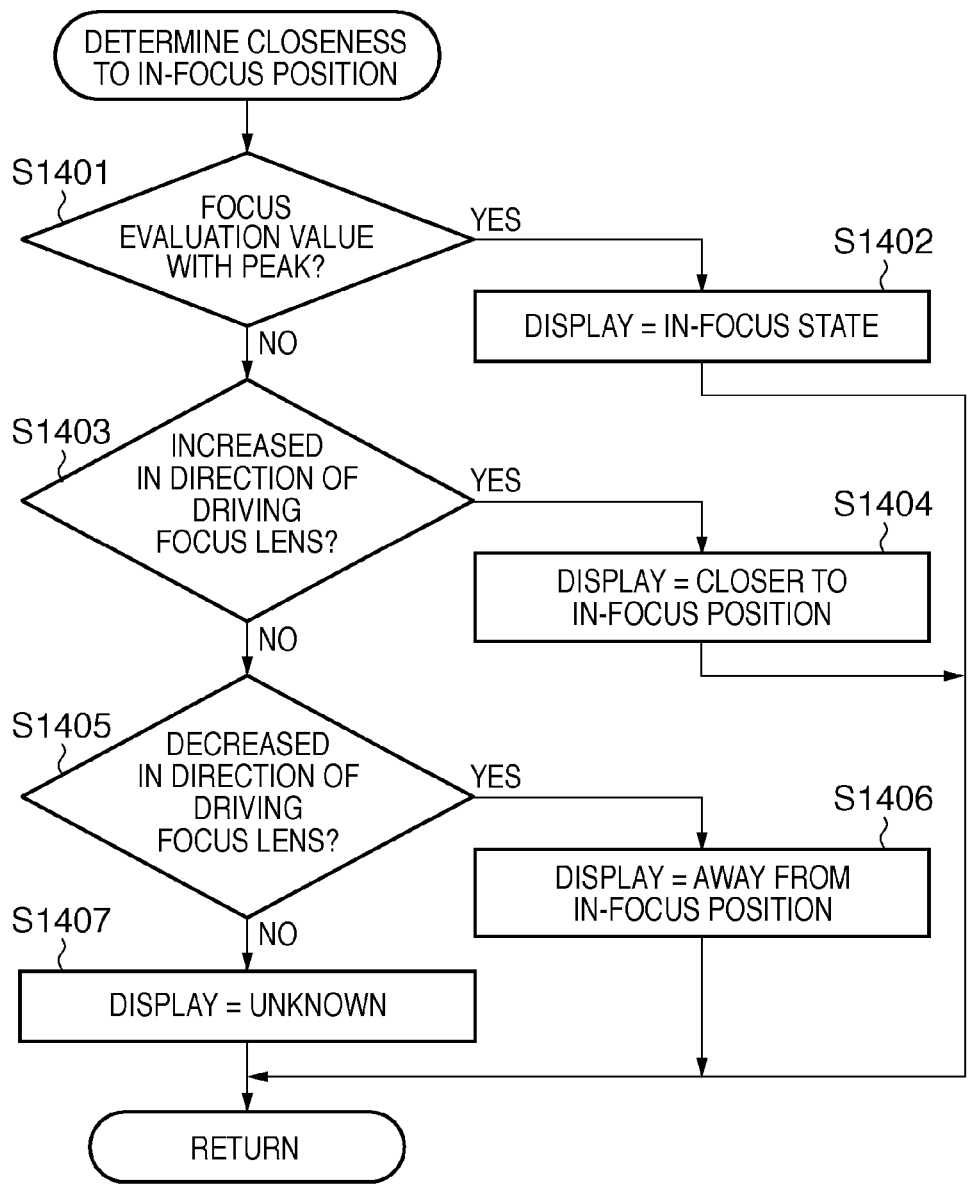

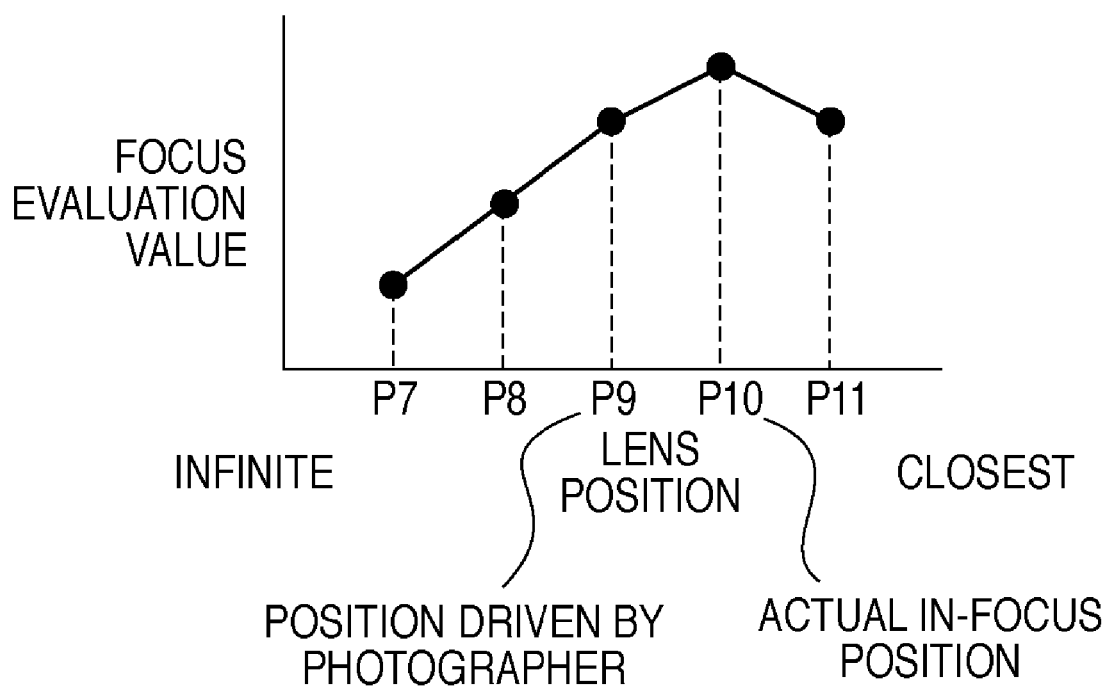
F I G. 18

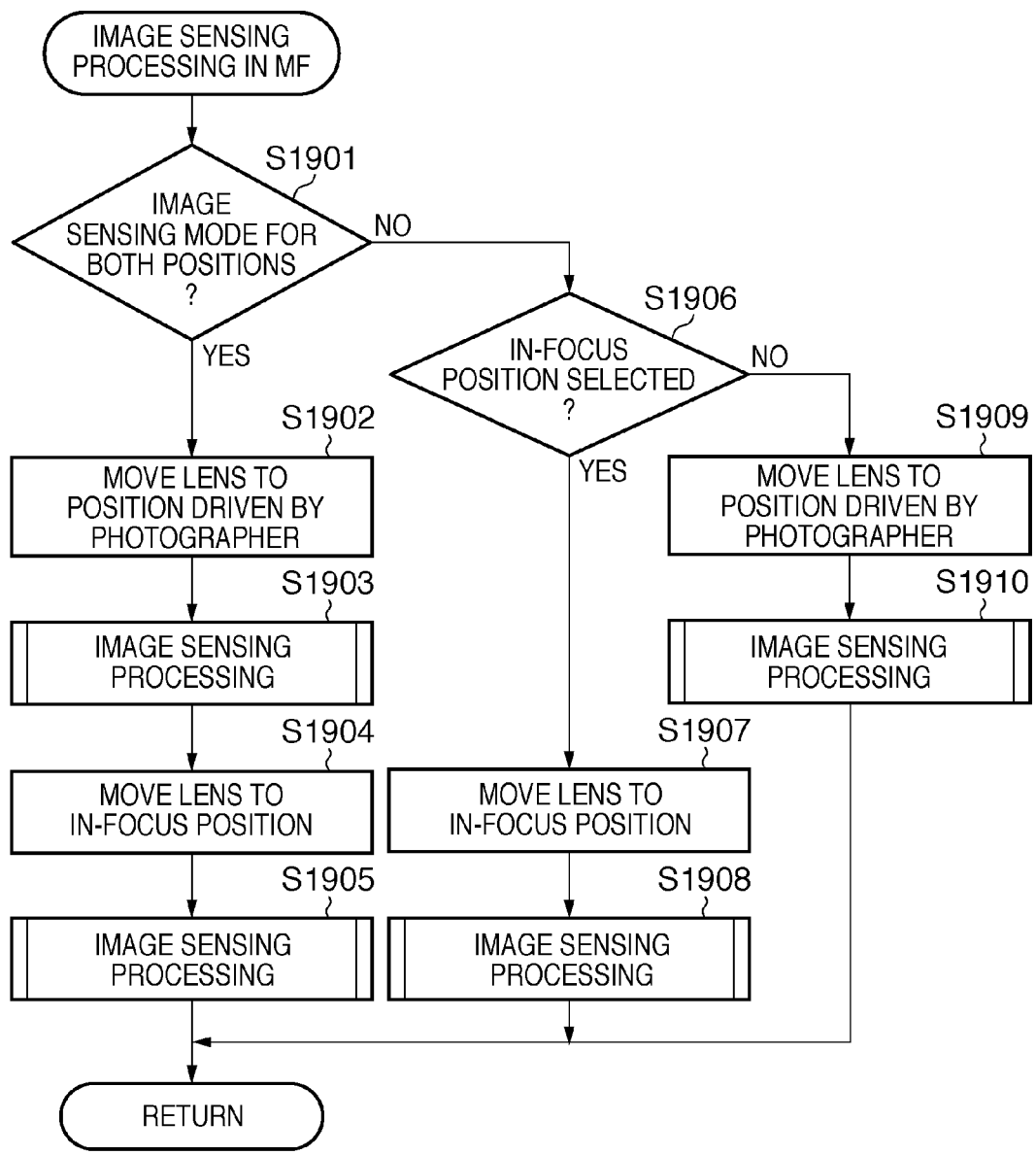

IMAGE SENSING APPARATUS PROVIDING DRIVING DIRECTION OF FOCUS LENS FOR ATTAINING IN-FOCUS STATE AND CONTROL METHOD THEREFOR

BACKGROUND OF THE INVENTION

1. Field of the Invention

The present invention relates to an image sensing apparatus such as an electronic still camera and a control method therefor.

2. Description of the Related Art

Conventionally, electronic still cameras and video cameras use a manual focus function which is able to focus on a subject by a photographer's operation of moving a focus lens. In this case, in a case in which an electronic viewfinder is used for focusing, the photographer moves a focus lens to a position considered in focus most, while checking the degree of defocus of an image displayed on the electronic viewfinder. However, it has been difficult for a photographer to carry out focusing precisely while checking an image displayed on the electronic viewfinder, since the electronic viewfinder has a small screen and a low resolution.

In order to solve this problem, a method has been devised for notifying a photographer of the direction of moving a focus lens for focusing. A lens focus state display apparatus disclosed in Japanese Patent Laid-Open No. 6-319073 is intended to automatically detect the gray-scale ratio for a subject in such a way the gray-scale ratio corresponds to the position of a focus lens, and display an indication in such a way the focus lens is moved in a direction in which the gray-scale ratio is increased.

However, in order to obtain the direction of moving the focus lens for focusing with the use of the gray-scale ratio (contrast) for a subject corresponding to the position of the focus lens, it is necessary to obtain the contrast at multiple focus lens positions. As a result, the focus lens will be substantially moved to defocus an image displayed on an electronic viewfinder, resulting poor visual quality. Furthermore, the photographer also feels strangeness, because the degree of defocus of an image on the electronic viewfinder is varied automatically even without operation by the photographer.

SUMMARY OF THE INVENTION

The present invention has been made in consideration of the above situation, and allows the direction of moving a focus lens for focusing to be determined without affecting the focus state of image to be displayed on an electronic viewfinder.

According to the present invention, provided is an image sensing apparatus comprising: an image sensing unit including an image sensor for sensing an optical image of a subject entering through a focus lens, converting the optical image to electrical signals, and sequentially outputting the converted electrical signals as image signals; a display unit configured to display the image signals; an acquisition unit configured to obtain from the image signals a focus evaluation value indicating a focus state of an image; a control unit configured to exercise control so that, of the image signals, first image signals obtained every preset number of frames are displayed on the display unit, and second image signals obtained in frames other than the frames for the first image signals are used for acquisition of the focus evaluation values by the acquisition unit; and a determination unit configured to determine a driving direction of driving the focus lens for an in-focus state on the basis of the focus evaluation values obtained by the acquisition unit and displaying the determined driving direction on the display unit, wherein the focus lens is moved for image sensing in the frames for the second image signals to carry out image sensing of the subject at different focus lens positions for each frame.

According to the present invention, provided is a control method for an image sensing apparatus comprising an image sensing unit including an image sensor for sensing an optical image of a subject entering through a focus lens, converting the optical image to electrical signals, and sequentially outputting the converted electrical signals as image signals, and a display unit configured to display the image signals, the control method comprising: displaying, of the image signals, first image signals obtained every preset number of frames on the display unit; obtaining focus evaluation values each indicating a focus state of an image from second image signals obtained in frames other than the frames for the first image signals, of the image signals; determining a direction of driving the focus lens for an in-focus state on the basis of the obtained focus evaluation values; and displaying the determined driving direction on the display unit, wherein the focus lens is moved for image sensing in the frames for the second image signals to carry out image sensing of the subject at different focus lens positions for each frame.

Further features of the present invention will become apparent from the following description of exemplary embodiments with reference to the attached drawings.

BRIEF DESCRIPTION OF THE DRAWINGS

FIG. 10 is a diagram illustrating the relationship between each frame and the intended use of data acquired in each frame according to the first embodiment of the present invention;

FIG. 11 is a diagram illustrating the position of the focus lens in each frame according to the first embodiment of the present invention;

FIG. 15 is a flowchart showing processing for a determination of closeness to the in-focus position according to the third embodiment of the present invention;

FIG. 18 is a diagram illustrating the relationship between the position of the focus lens and the focus evaluation value in image sensing according to a fourth embodiment of the present invention; and FIG. 19 is a flowchart showing image sensing processing in MF according to the fourth embodiment of the present invention.

DESCRIPTION OF THE EMBODIMENTS

Preferred embodiments of the present invention will be described in detail in accordance with the accompanying drawings.

Figure 1:
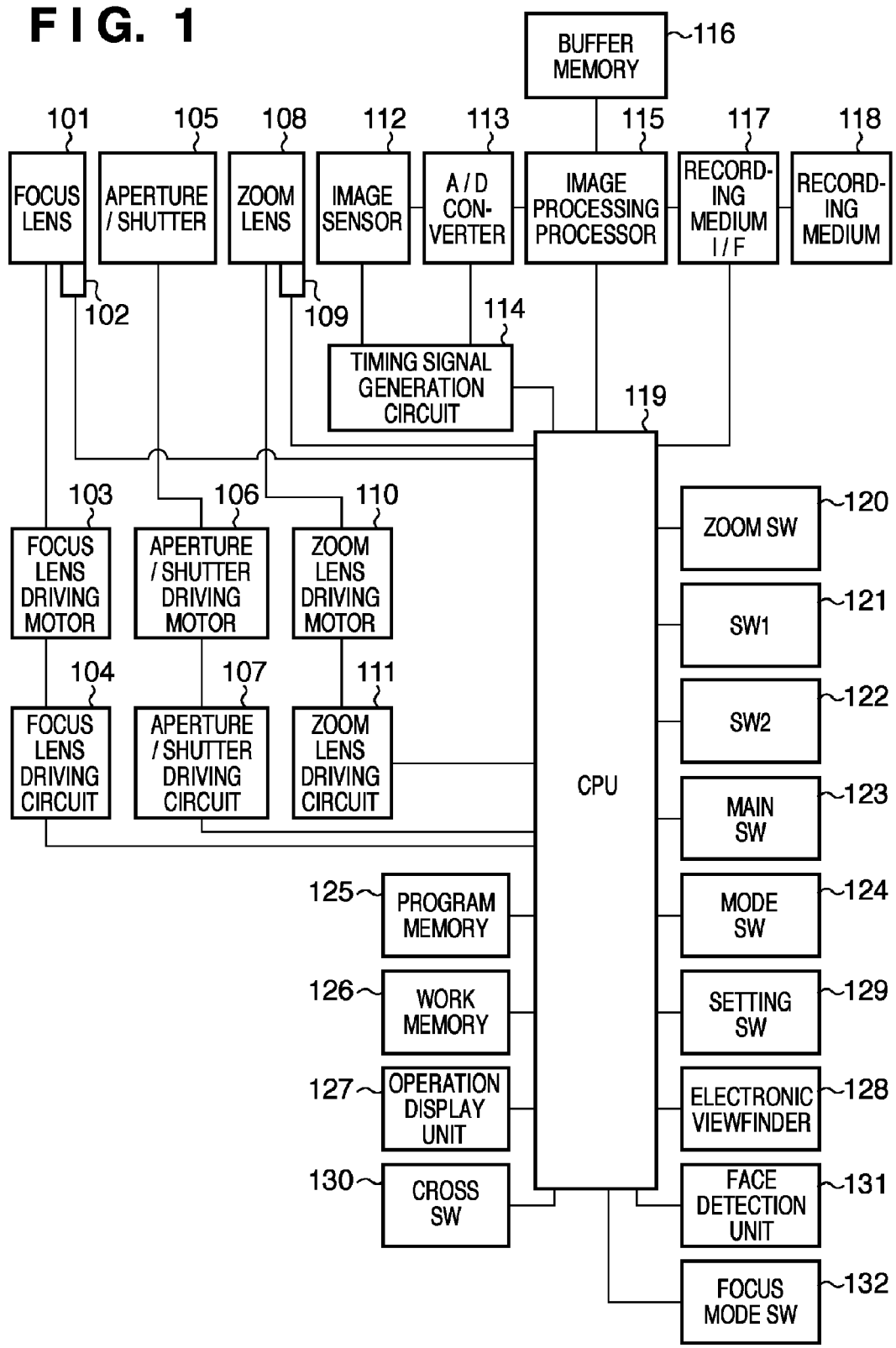
FIG. 1 is a block diagram illustrating a schematic configuration of a digital camera according to an embodiment of the present invention.

FIG. 1 is a block diagram illustrating a schematic configuration of a digital camera which is an example of an image sensing apparatus according to an embodiment of the present invention.

Reference numeral 101 denotes a focus lens for focusing on an image sensor 112 described below, and reference numeral 102 denotes a photo interrupter for detecting the initial position of the focus lens 101. Furthermore, reference numeral 103 denotes a focus lens driving motor for driving the focus lens 101, and reference numeral 104 denotes a focus lens driving circuit for inputting a driving signal to the focus lens driving motor 103 to move the focus lens 101.

Reference numeral 105 denotes a light quantity controlling member (hereinafter, "aperture/shutter") such as an aperture and a shutter, and reference numeral 106 denotes an aperture/shutter driving motor for driving the aperture/shutter 105. Furthermore, reference numeral 107 denotes an aperture/shutter driving circuit for inputting a driving signal to the aperture/shutter driving motor 106 to move the aperture/shutter 105.

Reference numeral 108 denotes a zoom lens for changing the focal length of a photographing lens, and reference numeral 109 denotes a photo interrupter for detecting the initial position of the zoom lens 108. Furthermore, reference numeral 110 denotes a zoom lens driving motor for driving the zoom lens 108, and reference numeral 111 denotes a zoom lens driving circuit for inputting a driving signal to the zoom lens driving motor 110 to move the zoom lens 108.

Reference numeral 112 denotes an image sensor for converting an incident optical image of a subject into electrical signals and sequentially outputting the electrical signals, and reference numeral 113 denotes an A/D converter for converting analog signals output from the image sensor 112 into digital signals. Furthermore, reference numeral 114 denotes a timing signal generation circuit (TG) for generating a timing signal required to operate the image sensor 112 and the A/D converter 113.

Reference numeral 115 denotes an image processing processor for applying a predetermined type of processing to image data output from the A/D converter 113, and reference numeral 116 denotes a buffer memory for temporarily storing image data processed by the image processing processor 115.

Reference numeral 117 denotes an interface for connecting to a recording medium 118 described below, and reference numeral 118 denotes a recording medium such as a memory card or a hard disk.

Reference numeral 119 denotes a microcontroller (hereinafter, referred to as a "CPU") for controlling the entire system.

Reference numeral 120 denotes a zoom switch (SW) for inputting to the CPU 119 signals requesting start and stop of zoom operation. Reference numeral 121 denotes a switch (denoted by "SW1" in FIG. 1) for requesting an image sensing preparation, such as AF or AE, and reference numeral 122 denotes an image sensing processing requesting switch (denoted by "SW2" in FIG. 1) for requesting image sensing processing, such as main exposure and recording operation, after operating the image sensing preparation requesting switch 121. Reference numeral 123 denotes a main switch (SW) for powering on the system, and reference numeral 124 denotes a mode switch (SW) for setting the operation mode of the camera.

Reference numeral 125 denotes a program memory on which is stored a program to be executed in the CPU 119, and reference numeral 126 denotes a work memory for temporarily storing various types of data required when the CPU 119 caries out processing in accordance with a program stored in the program memory 125. Reference numeral 127 denotes an operation display unit for displaying the operating state of the camera and a wide variety of warnings, and reference numeral 128 denotes an electronic viewfinder (EVF) for displaying images. Reference numeral 129 denotes a setting switch (SW) for a wide variety of settings. Reference numeral 130 denotes a cross switch (SW) for use in selection of menu items displayed on the operation display unit 127 or the EVF 128 and in requests for moving the location of a focus detection frame (AF frame) indicating a focus detection area. Reference numeral 131 denotes a face detection unit for detecting a face from sensed image signals (an image). Reference numeral 132 denotes a focus mode switch for switching between autofocusing (hereinafter, referred to as AF) and manual focusing (hereinafter, referred to as MF). It is to be noted that, in the present embodiment, the photographer uses the cross SW 130 to request driving the focus lens 101 when the MF is set. For example, instructions can be issued in such a way that the focus lens 101 is driven toward the infinite distance by pressing a right switch of the cross SW, and driven closer and closer by pressing a left switch thereof. It is to be noted that the method for requesting the focus lens to be driven is not considered limited to the method described above, and alternatively, conventionally used methods may be used.

<First Embodiment>

Next, operation of a digital camera which has the configuration described above in a first embodiment will be described with reference to a flowchart of FIG. 2.

First, in step S201, the driving mode of the image sensor 112 is set in an EVF driving mode for displaying an image on the EVF 128 while being ready and waiting for image sensing. Next, in step S202, the state of the SW1 for requesting image sensing preparation is determined. If the SW1 is ON, the processing proceeds to step S208, or if not, the processing proceeds to step S203.

In step S203, face detection processing is carried out. It is to be noted that the details of the face detection processing will be described below with reference to FIG. 3. In step S204, AE operation is carried out in such a way that the aperture/shutter 105 and the exposure period are controlled to optimize the luminance of the image displayed on the EVF 128. In step S205, automatic white balance (AWB) operation is carried out in such a way that the image displayed on the EVF 128 has an appropriate color balance regardless of the color temperature of a light source. In step S206, the image processing processor 115 is used to apply a predetermined type of processing to image signals read out from the image sensor 112, and display the image signals on the EVF 128. In step S207, MF processing is carried out. The details of this MF processing carried out in this step S207 will be described below.

On the other hand, when the SW1 is ON, AE operation for main image sensing is carried out in step S208. In step S209, the state of the focus mode switch 132 is determined. If the focus mode switch 132 is set in MF, the processing proceeds to step S211, or if not, the processing proceeds to step S210. In step S210, AF for main image sensing is carried out. In step S211, the state of the SW2 is determined. If the SW2 is ON, the processing proceeds to the step S212. In step S212, image sensing processing is carried out in accordance with a procedure described below.

Figure 2:
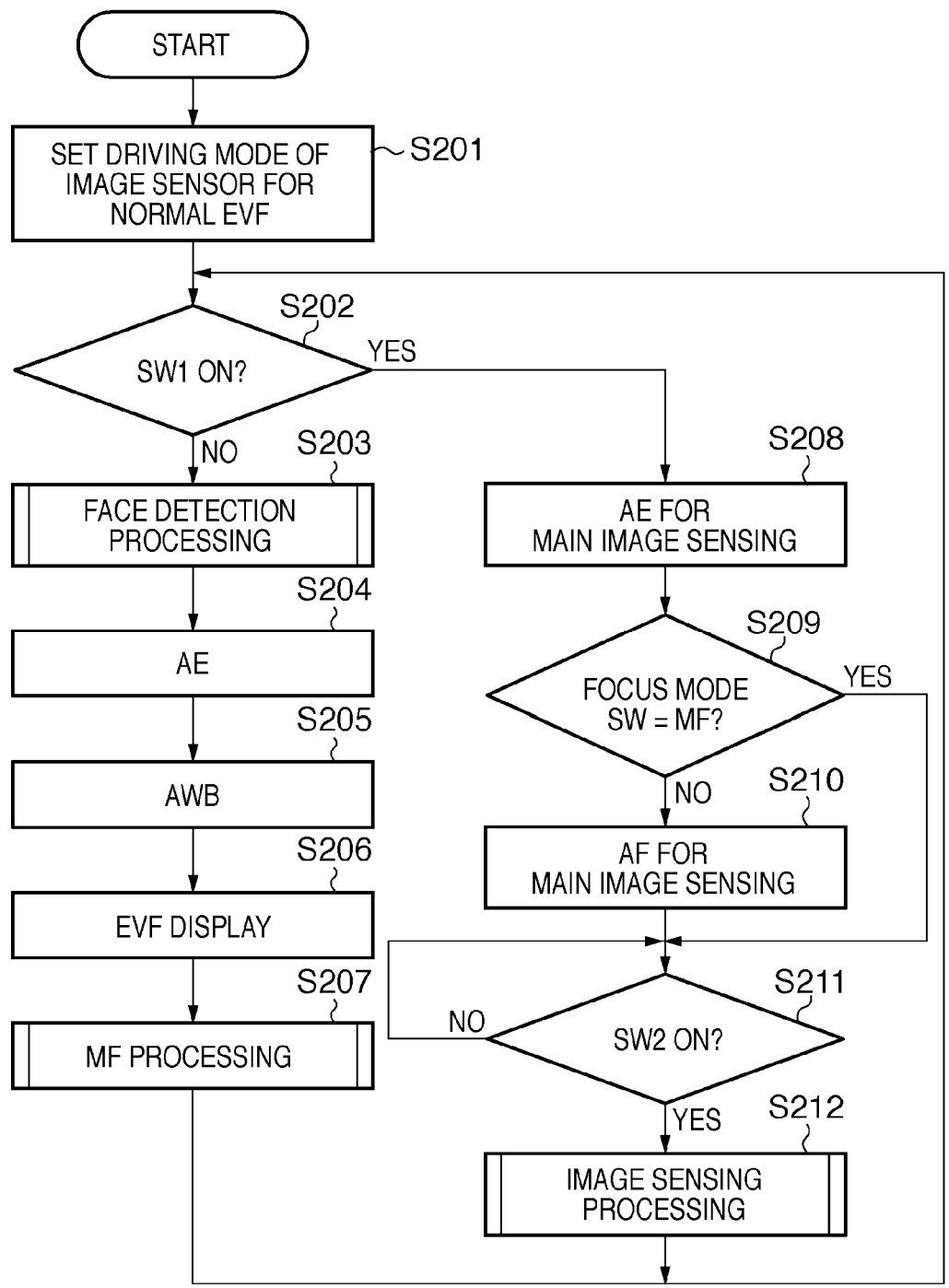
FIG. 2 is a flowchart showing basic operations of a digital camera according to a first embodiment of the present invention.
Figure 3:
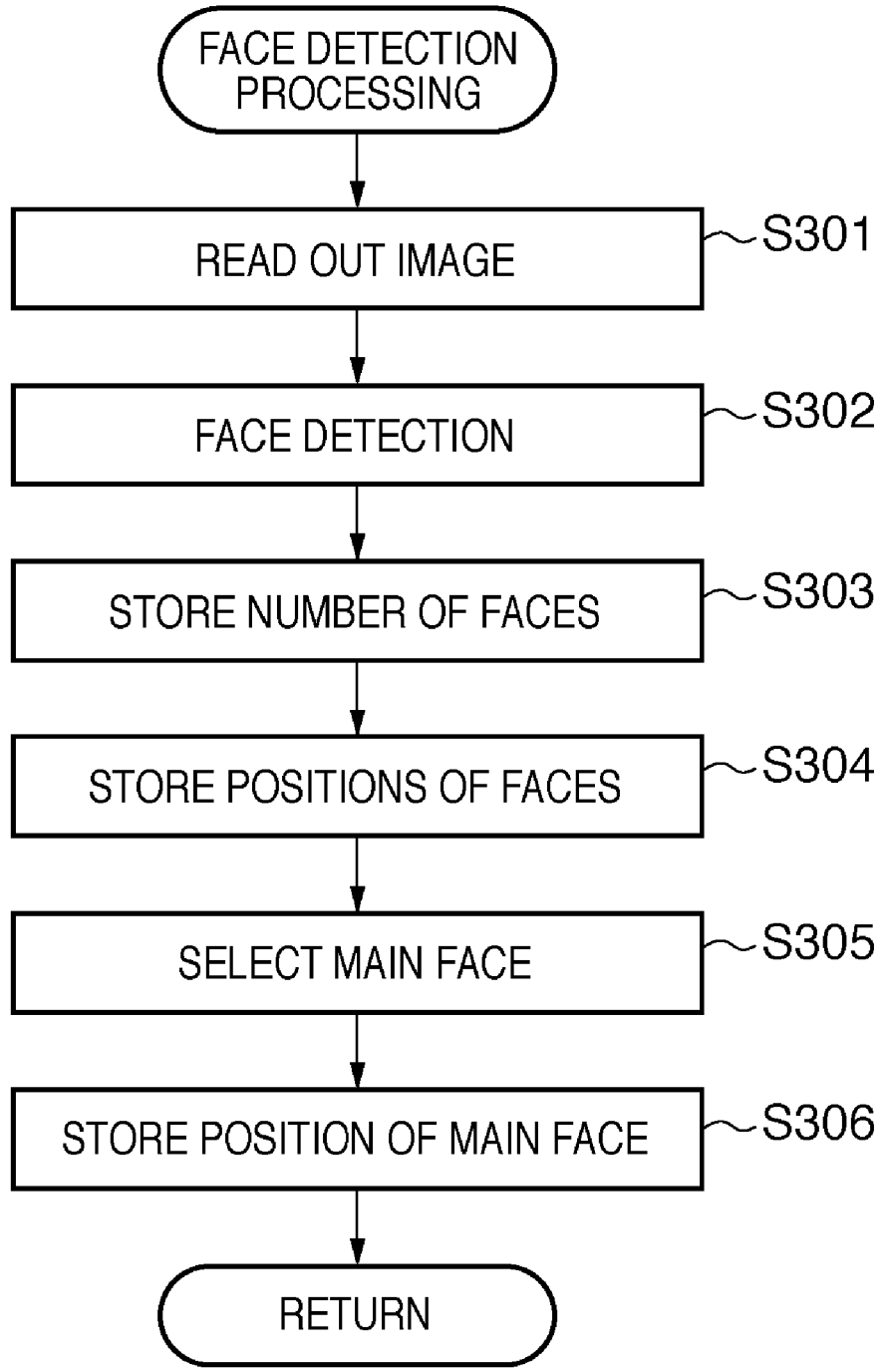
FIG. 3 is a flowchart showing face detection processing according to the first embodiment of the present invention.

FIG. 3 is a flowchart for explaining the face detection processing carried out in step S203 of FIG. 2. First, in step S301, image signals are read out from the image sensor 112. In step S302, the face detection unit 131 is used to detect a face of a subject from the image signals read out in step S301. As a method for face detection, for example, a learning approach typified by a neural network can be used, or an approach can be used in which a site in a physically characteristic shape, such as eyes, noses, mouths, and contours of faces, is identified from image information with the use of template matching. In addition, reference may be made to an approach of detecting the feature quantity of image information such as the color of skin and the shape of an eye and using a statistical analysis. In step S303, the number of faces detected in step S302 is stored in the work memory 126. In step S304, the positions of the face detected in step S302 in the horizontal and vertical directions in the screen are stored in the work memory 126. In this case, the positions corresponding to the number of faces stored in step S303 are to be stored. In step S305, the face of a main subject (hereinafter, referred to as a main face) is selected from the faces detected in step S302. As the method for selecting the main face, the position and size of the face are determined to determine the main face. More specifically, the face with its position closest to the center of the screen or the face with the largest size is determined as the main face. In step S306, the position of the main face selected in step S305 is stored in the work memory 126.

Figure 4:
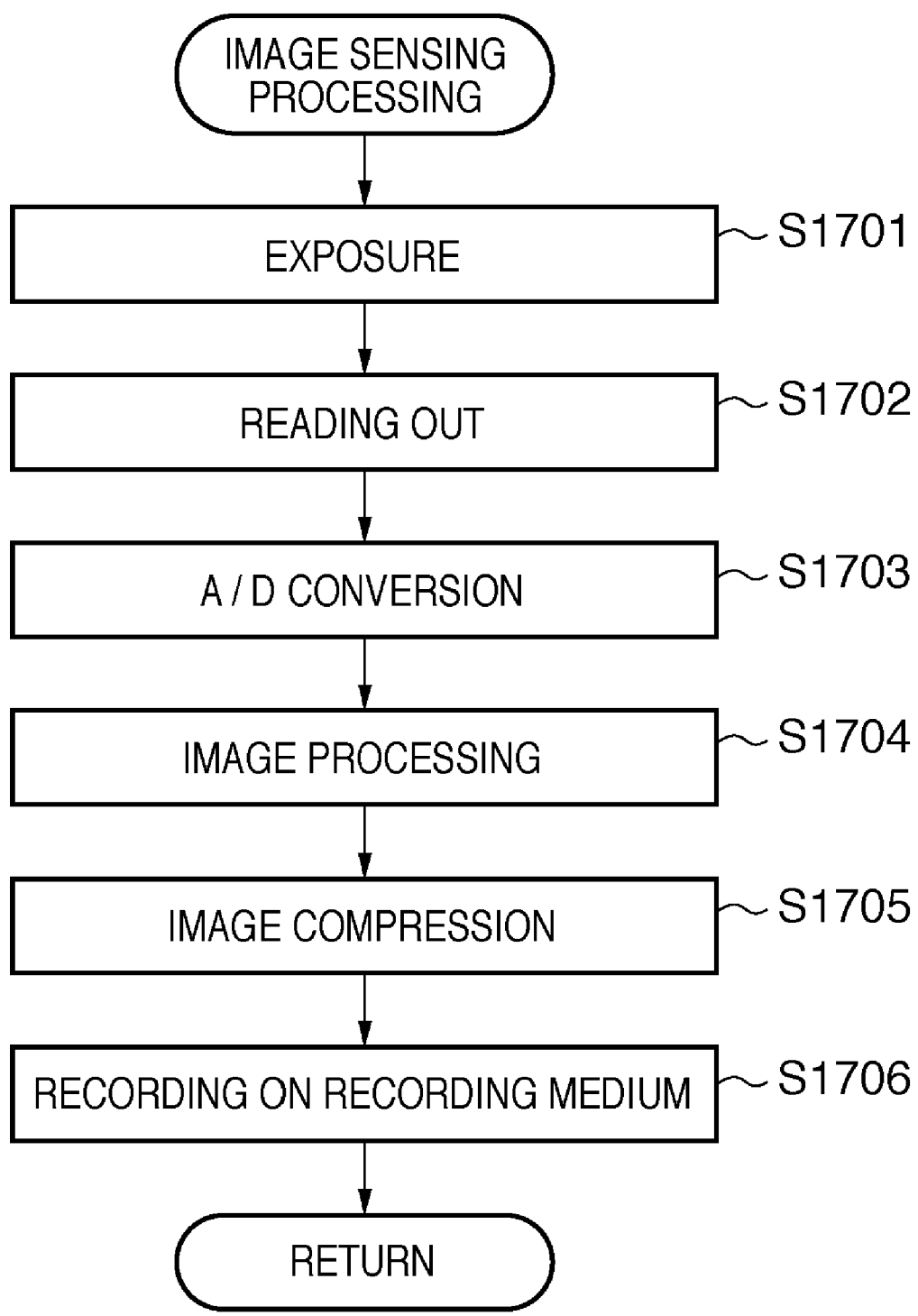
FIG. 4 is a flowchart showing image sensing processing according to the first embodiment of the present invention.

FIG. 4 is a flowchart for explaining the image sensing processing carried out in step S212 of FIG. 2. First, in step S1701, the image sensor 112 is subjected to exposure. In step S1702, data accumulated in the image sensor 112 is read out. In step S1703, the A/D converter 113 is used to convert analog signals read out from the image sensor 112 into digital signals. In step S1704, the image processing processor 115 is used to apply various types of image processing to digital signals output from the A/D converter 113. In step S1705, the image processed in step S1704 is compressed in accordance with a format such as JPEG. In step S1706, the data compressed in step S1705 is recorded on the recording medium 118 such as a memory card mounted on the electric camera main body via the recording medium interface 117.

Figure 5A:
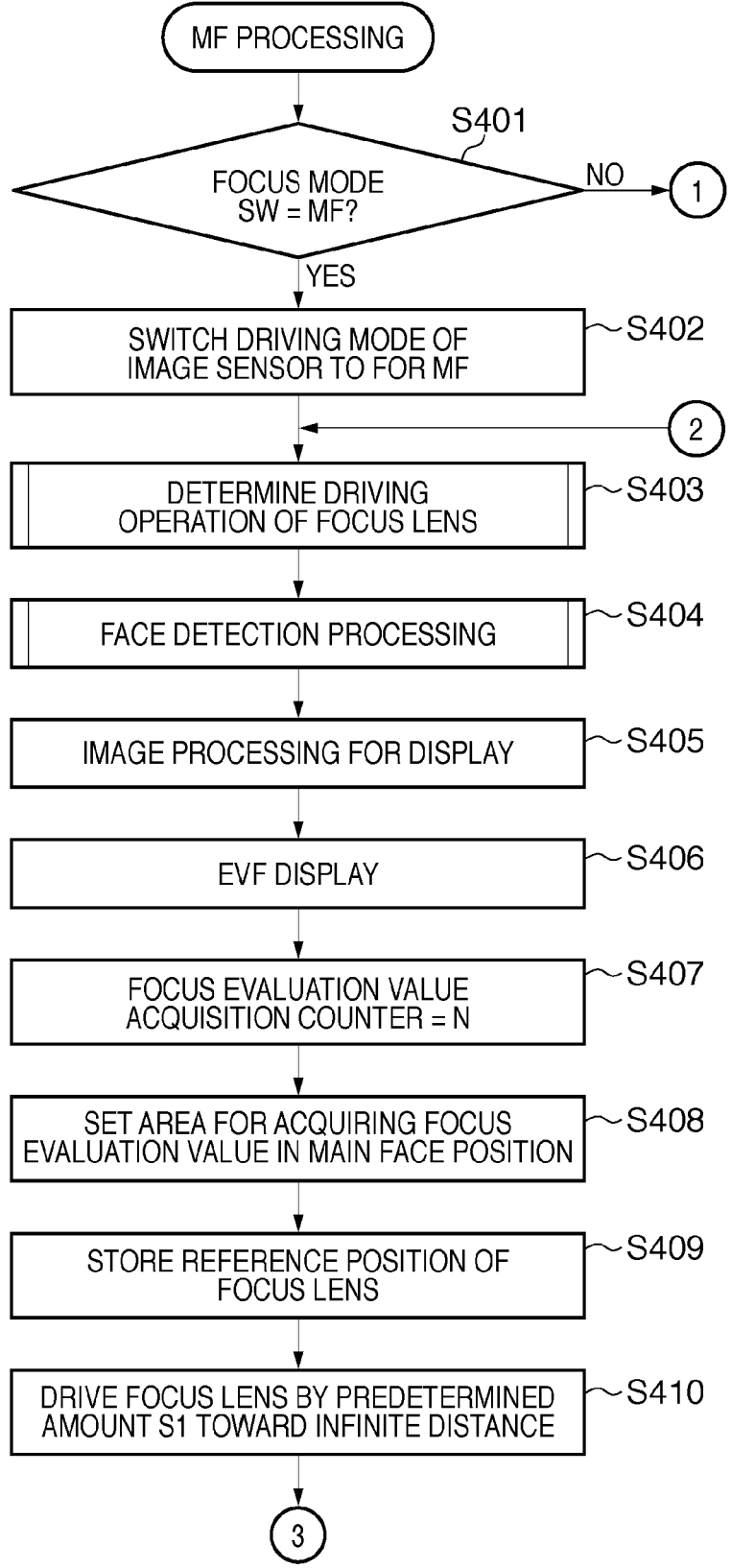
FIGS. 5A and 5B are flowcharts showing MF processing according to the first embodiment of the present invention.
Figure 5B:
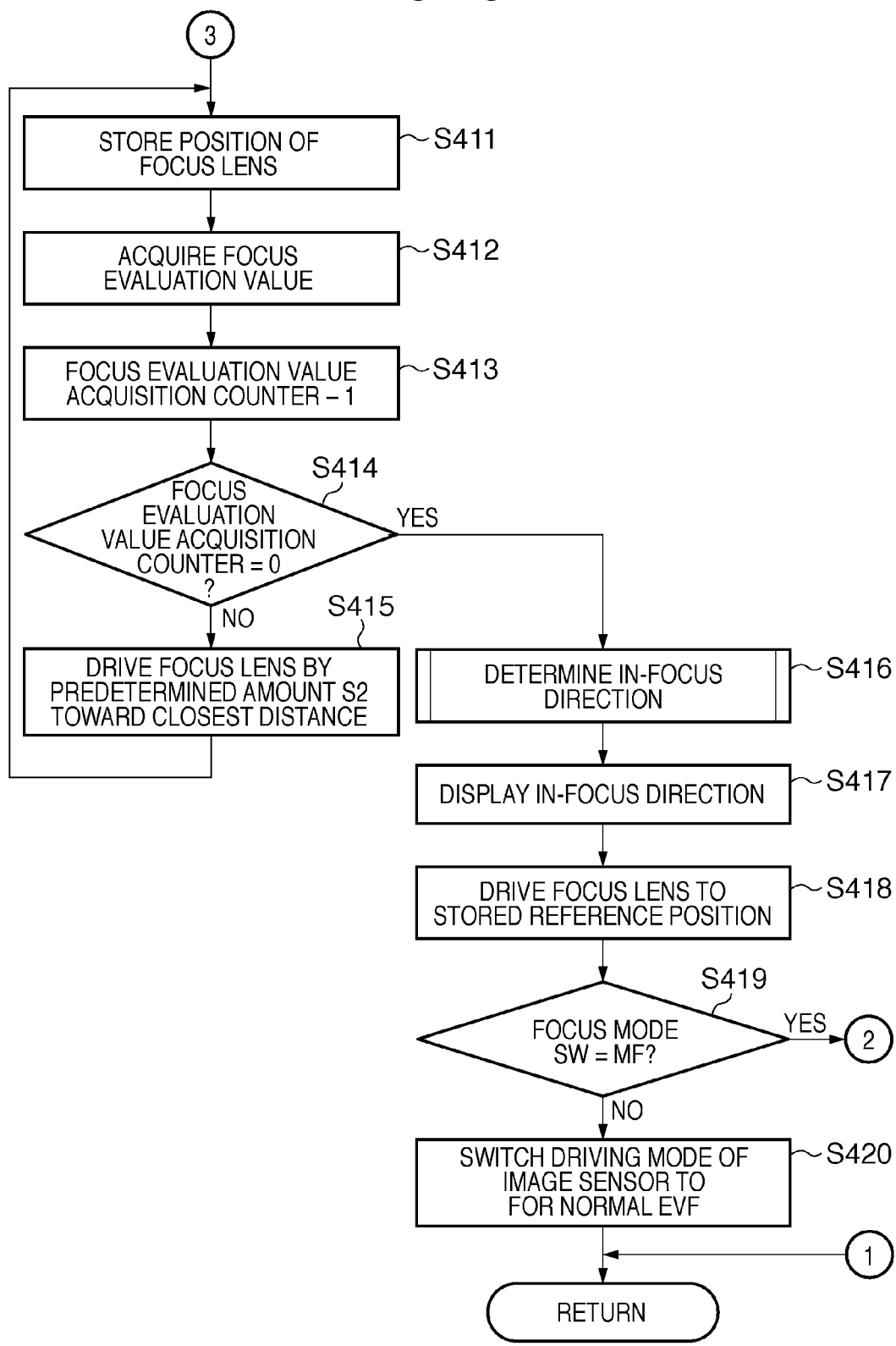

FIGS. 5A and 5B are flowcharts for explaining the MF processing carried out in step S207 of FIG. 2. First, in step S401, the state of the focus mode switch 132 is determined. If the focus mode switch 132 is set in MF, the processing proceeds to step S402, or if not, the MF processing is ended.

In step S402, the driving mode of the image sensor 112 is switched from for EVF to for MF. The driving mode for MF here is set so that the number of frames per second is larger than in the driving mode for EVF. For example, when the number of frames is 30 per second in the driving mode for EVF, the driving mode for MF is set so that the number of frames is 120 per second. In step S403, processing for determining the driving operation of the focus lens 101 is carried out in accordance with a procedure described below. In step S404, face detection processing is carried out in accordance with the procedure shown in FIG. 3.

In step S405, the image processing processor 115 is used to apply image processing for display on the EVF 128 to image data read out from the image sensor 112. In step S406, the image processed in step S405 is displayed on the EVF 128. In step S407, a focus evaluation value acquisition counter is set to have a predetermined value N, which is stored in the work memory 126. The value N here is a positive integer. The focus evaluation value here refers to a value as described below. First, the A/D converter 113 is used to convert analog video signals read out from the image sensor 112 into digital signals. Furthermore, in the image processing processor 115, the luminance signals of the digital signals are passed through a predetermined bandpass filter to extract a certain frequency band, and this frequency band is integrated in the area for acquiring the focus evaluation value to obtain the focus evaluation value. The closer the subject is to the in-focus state, the larger the focus evaluation value becomes. In step S408, the area for acquiring the focus evaluation value is set in the position of the main face detected in step S404. In step S409, the current position of the focus lens 101 is stored as a reference position in the work memory 126.

In step S410, the focus lens 101 is driven toward the infinite distance by a predetermined amount. The predetermined amount in this case is referred to as S1, which is here a positive integer. In step S411, the current position of the focus lens 101 is acquired, and stored in the work memory 126. In a case in which a stepping motor is used for the focus lens driving motor 103, the number of relative driving pulses from the initial position detected by the photo interrupter 102 is determined as the position of the focus lens 101. Alternatively, a rotary encoder, not shown, or the like may be used to measure the absolute position. In step S412, the focus evaluation value for the current position of the focus lens is acquired, and stored in the work memory 126. In step S413, a value 1 is subtracted from the value of the focus evaluation value acquisition counter, and the value after the subtraction is stored in the work memory 126. In step S414, it is determined whether or not the focus evaluation value acquisition counter reaches 0. If the counter indicates 0, the processing proceeds to step S416, or if not, the processing proceeds to step S415. In step S415, the focus lens 101 is driven toward the closest distance by a predetermined amount. The predetermined amount in this case is referred to as S2. The predetermined amount S2 refers to a driving amount required to move, by a depth of focus, the position in which an image is formed by an image sensing optical system composed of the focus lens 101, the aperture/shutter 105, and the zoom lens 108, and is a positive integer. Furthermore, the relationship between the predetermined amount S1 described above and the predetermined amount S2 satisfies the following equation:

$$S1 = (N-1)/2 \times S2 \tag{1}$$

The processing from step S411 to step S415 is repeated as described, and the position and focus evaluation value of the focus lens 101 are stored in the work memory 126 for the predetermined number of times N set in step S407.

In step S416, the in-focus direction for indicating the direction of driving the focus lens 101, required for sharp focusing, is determined in accordance with a procedure described below. In step S417, the in-focus direction is displayed on the EVF 128 in accordance with the result of the determination in step S416 and the in-focus direction is stored in the work memory 126. In step S418, the focus lens 101 is driven to the reference position stored in step S409. In step S419, the state of the focus mode switch 132 is determined. If the focus mode switch 132 is set in MF, the processing is returned to step S403, or if not, the processing proceeds to step S420. In step S420, the driving mode of the image sensor 112 is switched from for MF to for EVF.

Figure 6:
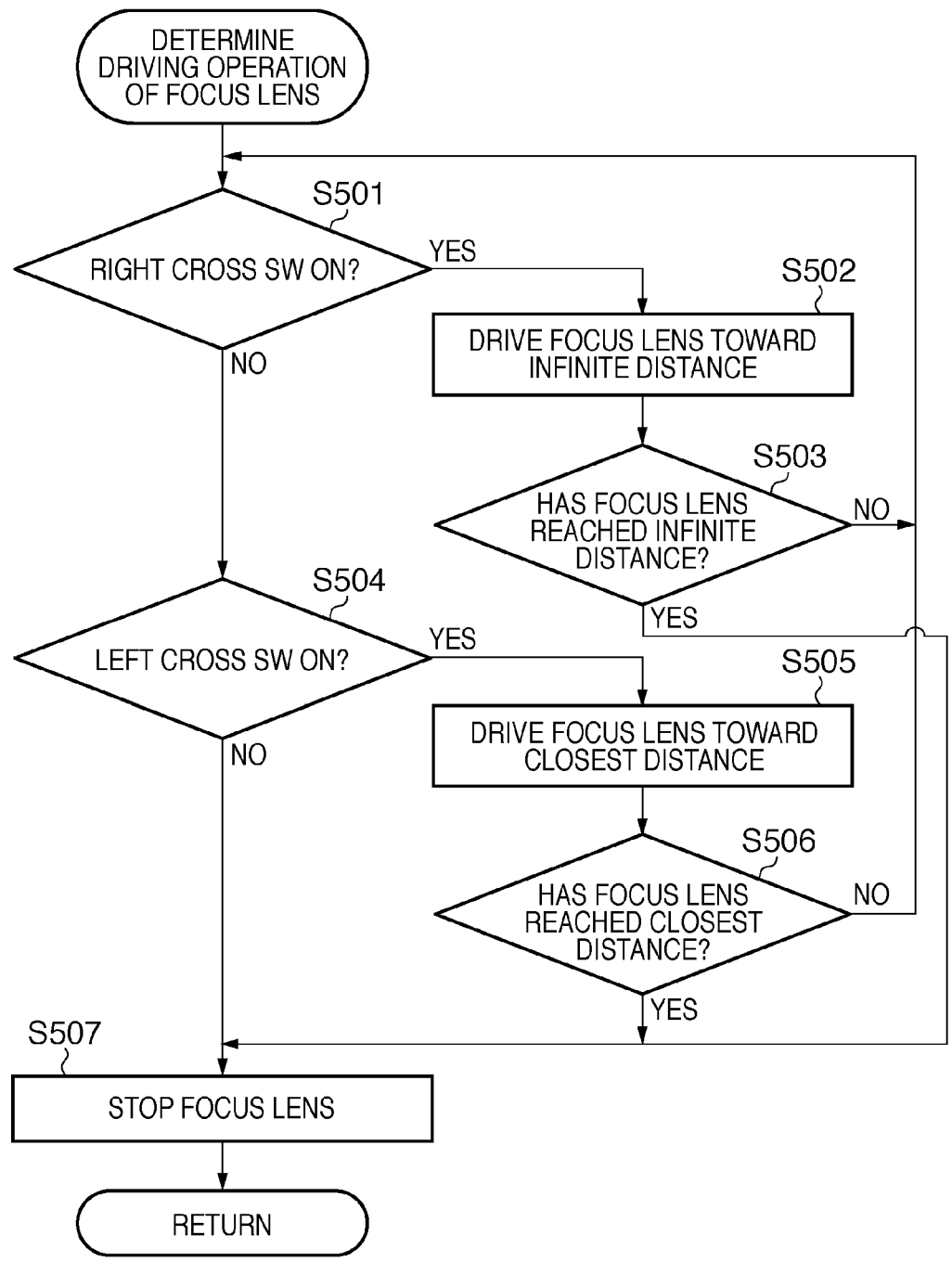
FIG. 6 is a flowchart showing processing for determining a driving operation of a focus lens according to the first embodiment of the present invention.

FIG. 6 is a flowchart for explaining the determination of driving the focus lens in step S403 of FIG. 5A. First, in step S501, it is checked whether or not the right switch of the cross SW 130 is ON. If the right switch is ON, the processing proceeds to step S502, or if not, the processing proceeds to step S504. In step S502, the focus lens 101 starts to be driven toward the infinite distance. The focus lens 101 is then kept moving toward the infinite distance until the processing for stopping the driving operation is subsequently requested. In step S503, it is checked whether or not the focus lens 101 reaches the infinite distance. If the focus lens 101 reaches the infinite distance, the processing proceeds to step S507, or if not, the processing is returned to step S501. It is to be noted that the infinite distance here refers to the position of the focus lens 101 focused on a subject at the infinite distance.

In step S504, it is checked whether or not the left switch of the cross SW 130 is ON. If the left switch is ON, the processing proceeds to step S505, or if not, the processing proceeds to step S507. In step S505, the focus lens 101 starts to be driven toward the closest distance. The focus lens 101 is then kept moving toward the closest distance until the processing for stopping the driving operation is subsequently requested. In step S506, it is checked whether or not the focus lens 101 reaches the closest distance. If the focus lens 101 reaches the closest distance, the processing proceeds to step S507, or if not, the processing is returned to step S501. It is to be noted that the closest distance here refers to the position of the focus lens 101 focused on a subject at the closest distance, and the closest distance is, for example, 10 cm here.

In step S507, the driving operation of the focus lens 101 is stopped.

Figure 7:
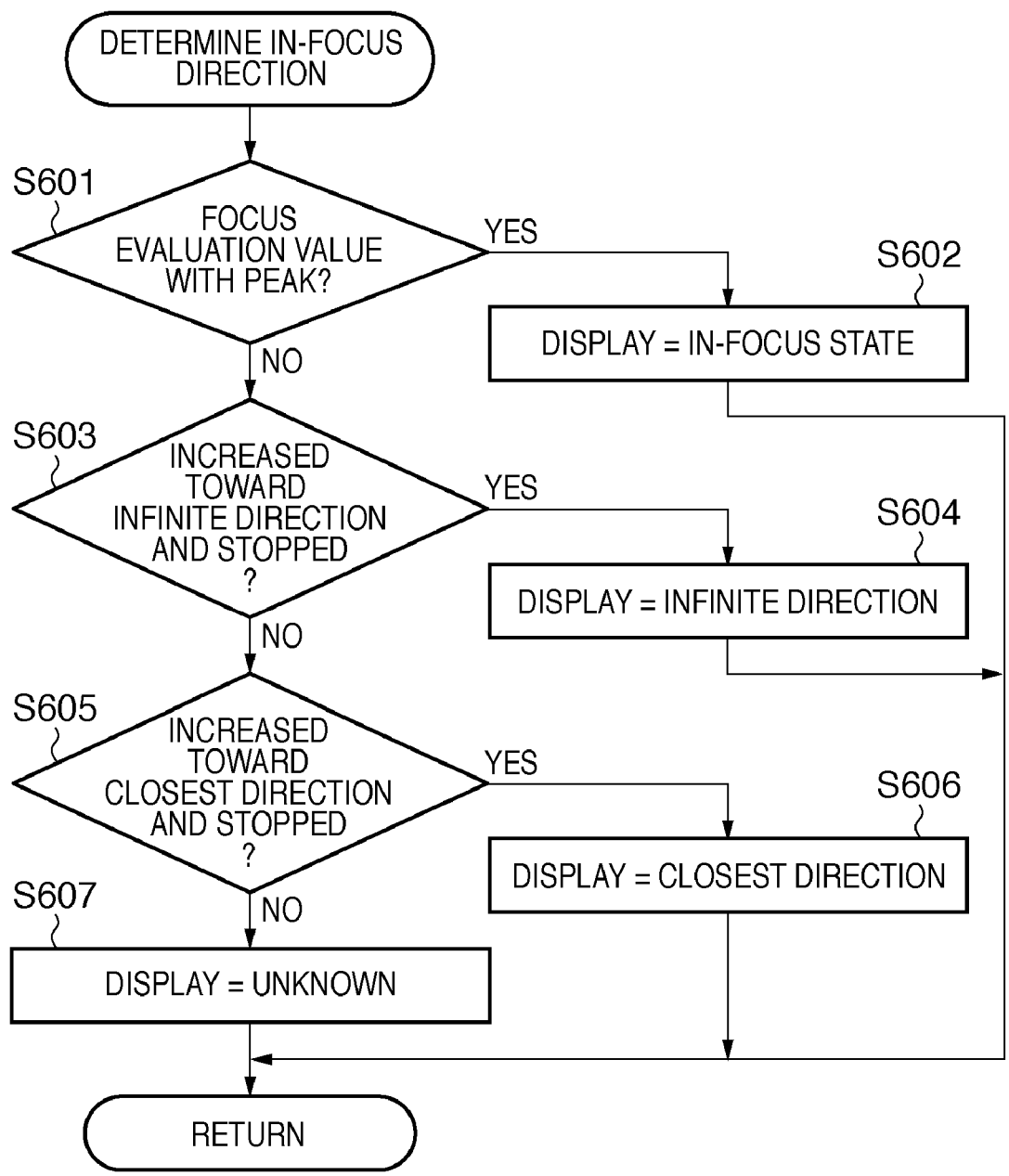
FIG. 7 is a flowchart showing processing for determining an in-focus direction according to the first embodiment of the present invention.

FIG. 7 is a flowchart for explaining the processing for determining the in-focus direction, carried out in step S416 of FIG. 5B. First, in step S601, the relationship with the focus evaluation value acquired in step S412 is checked in the N positions for the focus lens 101 stored in step S411 of FIG. 5B. Then, if the focus evaluation value forms a peak, the processing proceeds to step S602, or if not, the processing proceeds to step S603. In step S602, the in-focus direction displayed in step S417 of FIG. 5B is stored in the work memory 126 as data indicating an "in-focus state".

Furthermore, if the focus evaluation value is increased toward the infinite distance, and stopped (YES in step S603), the processing proceeds to step S604, or if not, the processing proceeds to step S605. In step S604, the in-focus direction displayed in step S417 of FIG. 5B is stored in the work memory 126 as data indicating an "infinity direction".

Alternatively, if the focus evaluation value is increased toward the closest distance, and stopped (YES in step S605), the processing proceeds to step S606, or if not, the processing proceeds to step S607. In step S606, the in-focus direction displayed in step S417 of FIG. 5B is stored in the work memory 126 as data indicating a "closest distance". In step S607, the in-focus direction displayed in step S417 of FIG. 5B is stored in the work memory 126 as "unknown".

Here, the relationship between the focus evaluation value and the in-focus direction will be described with reference to FIGS. 8A to 8D. Now, the focus evaluation value acquisition counter set in step S407 of FIG. 5A is N=3. Then, the equation (1) leads to S1=S2. Therefore, in step S410, the focus lens 101 will be driven by the predetermined amount S2 toward the infinite distance from the reference position stored in step S409. After acquiring the focus evaluation value in this position, the focus lens 101 is this time driven by the predetermined amount S2 toward the closest distance in step S415. In this way, step S411 to step S415 are repeated to store the position of the focus lens 101 and the focus evaluation value three times. The positions of the focus lens 101 stored in this case refer to the position P1 shifted from the reference position by S2 toward the infinite distance, the reference position P2, and the position P3 shifted from the reference position by S2 toward the closest distance.

The relationship to the focus evaluation value in these positions P1 to P3 is of four types, as shown in FIGS. 8A to 8D. In FIGS. 8A to 8D, the horizontal axis indicates the position of the focus lens 101, the left side refers to infinite distance, and the right side refers to the closest distance. The vertical axis indicates the focus evaluation value.

Figure 8A:
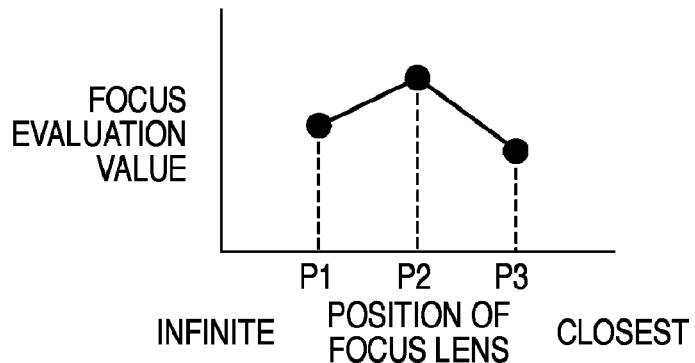
FIGS. 8A to 8D are diagrams illustrating a method for determining the in-focus direction according to the first embodiment of the present invention.

First, in FIG. 8A, the focus evaluation value in the position P2 is the largest among the three focus evaluation values. In this case, the reference position stored in step S409 of FIG. 5A is determined as the state of being visually in focus most. Therefore, the determination in this case indicates an in-focus state.

Figure 8B:
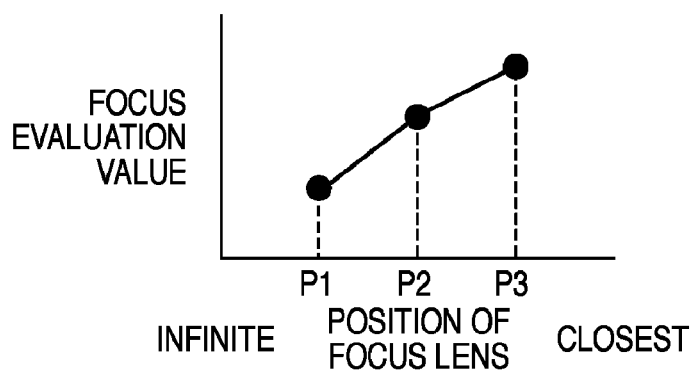

Next, in FIG. 8B, the focus evaluation value in the position P3 is the largest among the three focus evaluation values (increased toward the closest distance and stopped). In this case, the in-focus position is estimated farther toward the closest distance from the position P3. Therefore, the determination of the in-focus direction in this case indicates the closest distance.

Figure 8C:
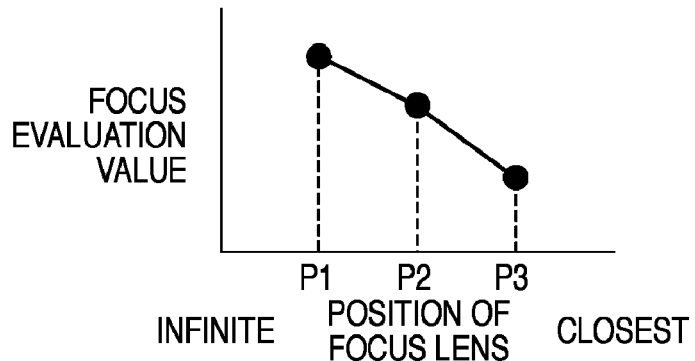

Next, in FIG. 8C, the focus evaluation value in the position P1 is the largest among the three focus evaluation values (increased toward the infinite distance and stopped). In this case, the in-focus position is estimated farther toward the infinite distance from the position P1. Therefore, the determination of the in-focus direction in this case indicates the infinite distance.

Figure 8D:
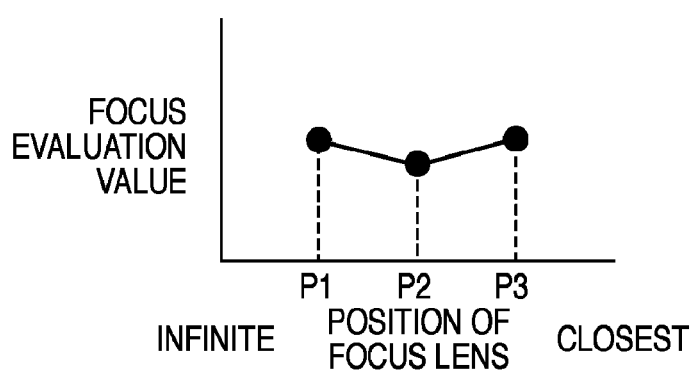

Next, in FIG. 8D, the focus evaluation value in the position P2 is the smallest among the three focus evaluation values. In this case, it is unknown if the in-focus position is to be directed toward the infinite distance or the closest distance. Therefore, the determination of the in-focus direction in this case indicates unknown.

The in-focus direction determined as described above is displayed on the EVF 128 as described in step S417 of FIG. 5B. An example of how to display the in-focus direction in this case will be described with reference to FIGS. 9A to 9D.

FIGS. 9A to 9D show four types of displays depending on the content of the in-focus display, each displaying triangle icons on both sides of a circular icon, with a quadrangular frame displayed as a focus frame in the position of a detected face.

Figure 9A:
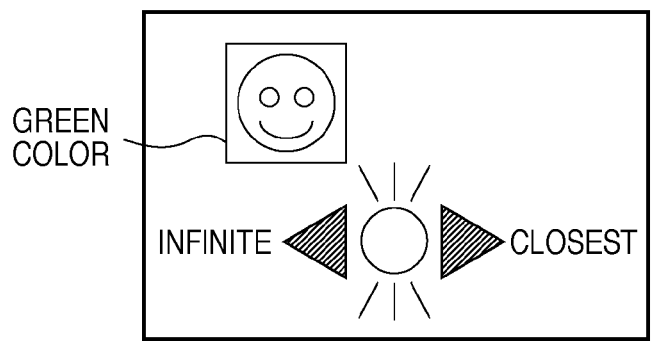
FIGS. 9A to 9D are diagrams for illustrating an example of displaying the in-focus direction according to the first embodiment of the present invention.

First, FIG. 9A is a diagram showing an in-focus state. In this case, the circular icon in the center is displayed in, for example, a white color, whereas the right and left triangle icons are displayed in, for example, a black color. Furthermore, the focus frame in the face position is displayed in, for example, a green color.

Figure 9B:
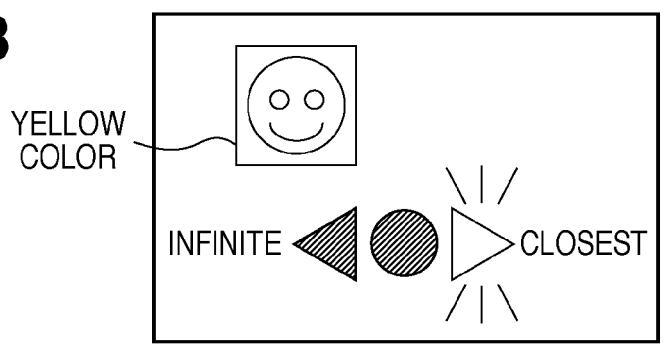

Next, FIG. 9B is a diagram showing the direction toward the closest distance. In this case, the right triangle icon is displayed in, for example, a white color, whereas the circular icon in the center and the left triangle icon are displayed in, for example, a black color. Furthermore, the focus frame in the face position is displayed in, for example, a yellow color.

Figure 9C:
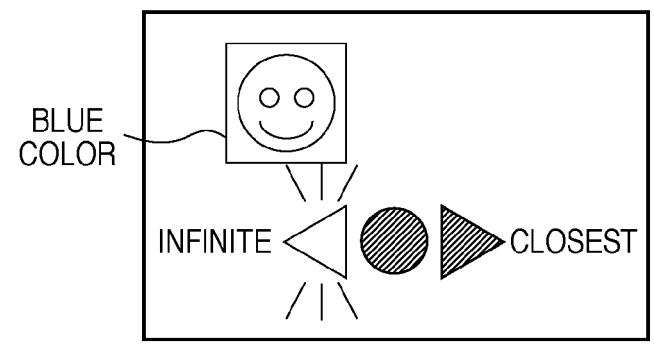

Next, FIG. 9C is a diagram showing the direction toward the infinite distance. In this case, the left triangle icon is displayed in, for example, a white color, whereas the circular icon in the center and the right triangle icon are displayed in, for example, a black color. Furthermore, the focus frame in the face position is displayed in, for example, a blue color.

Figure 9D:
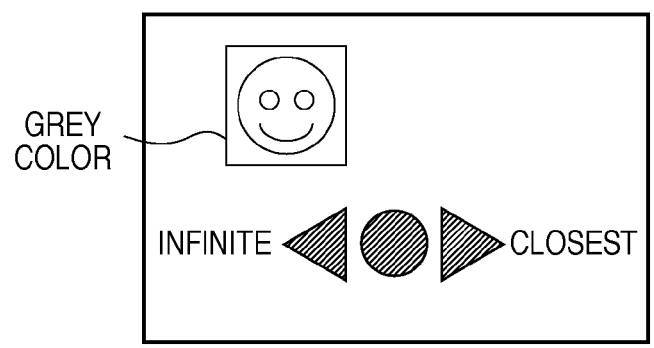

Next, FIG. 9D is a diagram showing the unknown. In this case, all of the icons are displayed in a black color. The focus frame in the face position is displayed in, for example, a gray color.

Thus, as described above, the photographer is able to know whether the in-focus state for a detected face is located on the closest distance side or on the infinite distance side with respect to the focus lens 101 operated by the photographer.

It is to be noted that how to display the in-focus direction shown in FIGS. 9A to 9D is just one example, and the display mode is not particularly very important as long as it is possible to notify the photographer of the in-focus direction for the focus lens 101. Furthermore, for example, not only visual display but also audio may be used as well.

Next, the timings of processing for display on the EVF 128 and of acquiring the focus evaluation value will be described in the case as shown in FIGS. 5A and 5B.

FIG. 10 is a diagram illustrating the data acquisition timing in a case in which the driving mode of the image sensor 112 is switched to the mode for MF. In this figure, the numbers 1, 2, 3, . . . denote the frame numbers.

First, as described in step S405 of FIG. 5A, image data exposed in the first frame is read out from the image sensor 112 and subjected to image processing for display on the EVF 128. The position of the focus lens 101 at this point corresponds to the reference position stored in step S409 of FIG. 5A. Next, in the second frame, the focus lens 101 is driven to a position for acquiring a focus evaluation value. Then, image data exposed in this frame is read out from the image sensor 112 to generate a focus evaluation value. In the third frame and the fourth frame, the same processing as in the second frame is carried out. The total time from the first frame to the fourth frame is equal to one frame in a case in which the driving mode of the image sensor 112 is a normal mode for EVF. More specifically, in the case of 30 frames/second for EVF and 120 frames/second for MF as described above, the number of frames which can be used for the generation of the focus evaluation value is 3 since four frames for MF is equal in time to one frame for EVF. Therefore, the focus evaluation value acquisition counter N may be 3 or less. In the case of 30 frames/second for EVF and 150 frames/second for MF as another example, five frames for MF is equal in time to one frame for EVF. In this case, the number of frames which can be used for the generation of the focus evaluation value is 4, and the focus evaluation value acquisition counter N may be thus 4 or less.

Next, in the fifth frame, the focus lens 101 is driven to the reference position stored in step S409 of FIG. 5A. In the same way as in the first frame, image data exposed in this position is read out from the image sensor 112 and subjected to image processing for display on the EVF 128. In the sixth frame to the eighth frame, the same processing as in the second frame to the fourth frame is carried out.

The position of the focus lens 101 in each frame in FIG. 10 is as shown in FIG. 11. In this figure, the numbers from 1 to 8 denote the frame numbers in the same way as in FIG. 10.

First, the position of the focus lens 101 in the first frame corresponds to the reference position stored in step S409 of FIG. 5A. The image sensor 112 is exposed in this position to read out image data. The image data read out at this point is used for display on the EVF 128. Next, in the second frame, the focus lens 101 is driven by S1 toward the infinite distance. The image sensor 112 is exposed in this position to read out image data. The image data read out at this point is used for the generation of the focus evaluation value. In the third frame, the focus lens 101 is driven by S2 toward the closest distance. This point indicates the state of S1=S2 in a case of the predetermined value N=3 set for the focus evaluation value acquisition counter as described above. Therefore, the position of the focus lens 101 in the third frame is equal to the position in the first frame. The image sensor 112 is exposed in this position to read out image data. The image data read out at this point is used for the generation of the focus evaluation value. In the fourth frame, the focus lens 101 is driven by S2 toward the closest distance in the same way as in the third frame. The image sensor 112 is exposed in this position to read out image data. The image data read out at this point is used for the generation of the focus evaluation value.

In the fifth frame, the focus lens 101 is driven to the reference position stored in step S409 of FIG. 5A. The image sensor 112 is exposed in this position to read out image data. The image data read out at this point is used for display on the EVF 128. In the sixth frame to the eighth frame, the same processing as in the second frame to the fourth frame is carried out.

In this way, the focus evaluation value can be acquired for the determination of the in-focus direction while displaying images on the EVF 128 in the same period as the period of a normal EVF display. Furthermore, the number of frames per second for the image displayed on the EVF 128 is the same as for normal EVF display. Therefore, the cycle of updating the image displayed on the EVF 128 is not delayed, avoiding a choppy display that provokes a feeling of strangeness.

Furthermore, the frames for the EVF display are distinguished from the frames for the acquisition of the focus evaluation value, and the focus lens 101 is driven only for the exposure in frames for acquiring the focus evaluation value. Therefore, no defocused images will be displayed on the EVF 128 due to the movement of the focus lens 101. Thus, the visual quality will not be degraded since the focus state of the image displayed on the EVF 128 is not affected.

On the other hand, when the MF processing is not to be carried out the driving mode of the image sensor 112 is set in the driving mode for normal EVF. In this driving mode, the number of frames per second is smaller than that in the driving mode for MF, and the power consumption can be thus reduced. This is because the smaller number of frames per second can reduce the frequency of the control clock to the image sensor 112, accordingly allowing the power consumption to be reduced.

<Second Embodiment>

In the first embodiment described above, the driving mode of the image sensor 112 is switched to the driving mode for MF when the MF processing is started. Alternatively, the driving mode may be switched between the processing for EVF display and the acquisition of the focus evaluation value. The processing in this case will be described below.

Figure 12A:
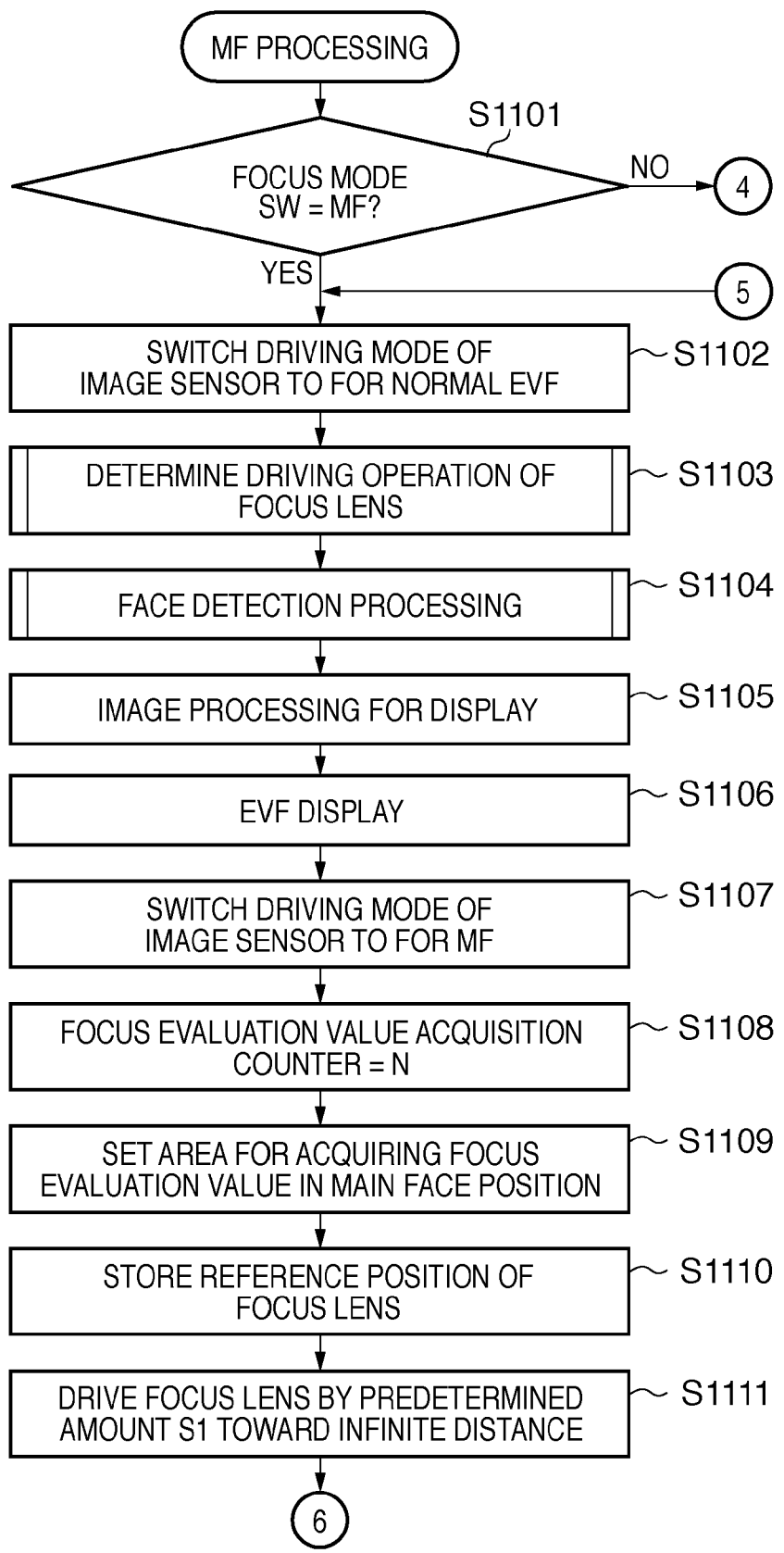
FIGS. 12A and 12B are flowcharts showing MF processing according to a second embodiment of the present invention.
Figure 12B:
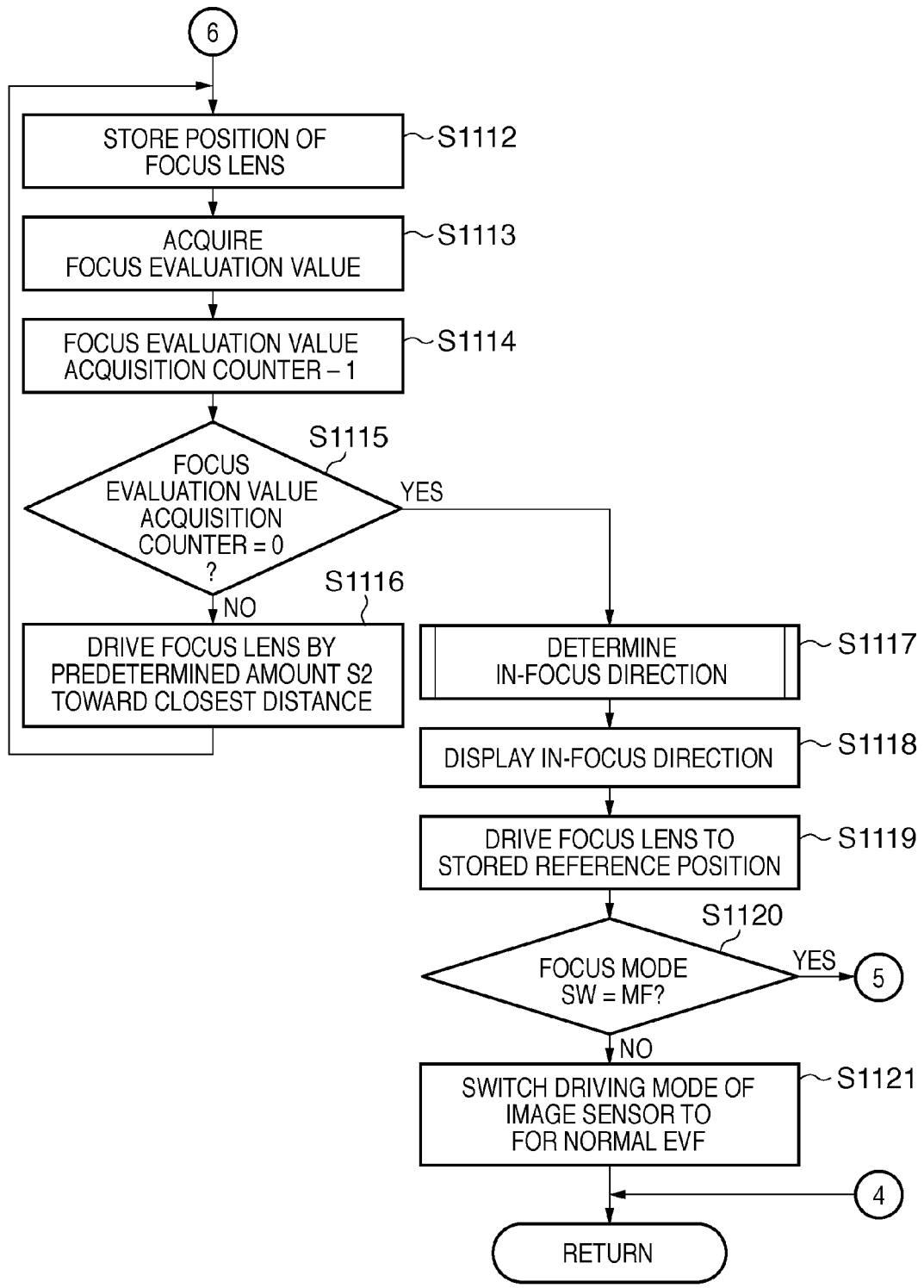

FIGS. 12A and 12B are a substitute for FIGS. 5A and 5B in the first embodiment. First, in step S1101, the state of the focus mode switch 132 is determined. If the focus mode switch is set in MF, the processing proceeds to step S1102, or if not, the present processing is ended.

In step S1102, the driving mode of the image sensor 112 is switched from for MF to for EVF. In step S1103, the processing for determining the driving operation of the focus lens 101 is carried out in accordance with the procedure described with reference to FIG. 6 in the first embodiment. In step S1104, the face detection processing is carried out in accordance with the procedure described with reference to FIG. 3 in the first embodiment. In step S1105, the image processing processor 115 is used to apply image processing for display on the EVF 128 to image data read out from the image sensor 112. In step S1106, the image processed in step S1105 is displayed on the EVF 128.

In step S1107, the driving mode of the image sensor 112 is switched from for EVF to for MF. The driving mode for MF here is the same as that described in the first embodiment.

The processing from step S1108 to step S1119 is carried out in the same way as from step S407 to step S418 in FIG. 5B.

In step S1120, the state of the focus mode switch 132 is determined. If the focus mode switch 132 is set in MF, the processing proceeds to step S1102, or if not, the processing proceeds to step S1121. In step S1121, the driving mode of the image sensor 112 is switched from for MF to for EVF.

As described above, according to the second embodiment, after the EVF display in step S1106, the driving mode is switched from for EVF to for MF in step S1107. Therefore, the time per frame is changed between the first frame and the second to fourth frames in FIG. 10. Therefore, the optimum exposure period can be set for each of for the EVF display and for the generation of the focus evaluation value. Accordingly, appropriate exposure can be obtained for subjects with various levels of luminance, and the visual quality of the image displayed on the EVF 128 can be thus further improved.

<Third Embodiment>

In the first and second embodiments described above, the in-focus direction is determined after the photographer drives the focus lens 101. However, the in-focus direction may be determined also while driving the focus lens 101 by the photographer. In the third embodiment, the processing in such a configuration will be described below.

Figure 13:
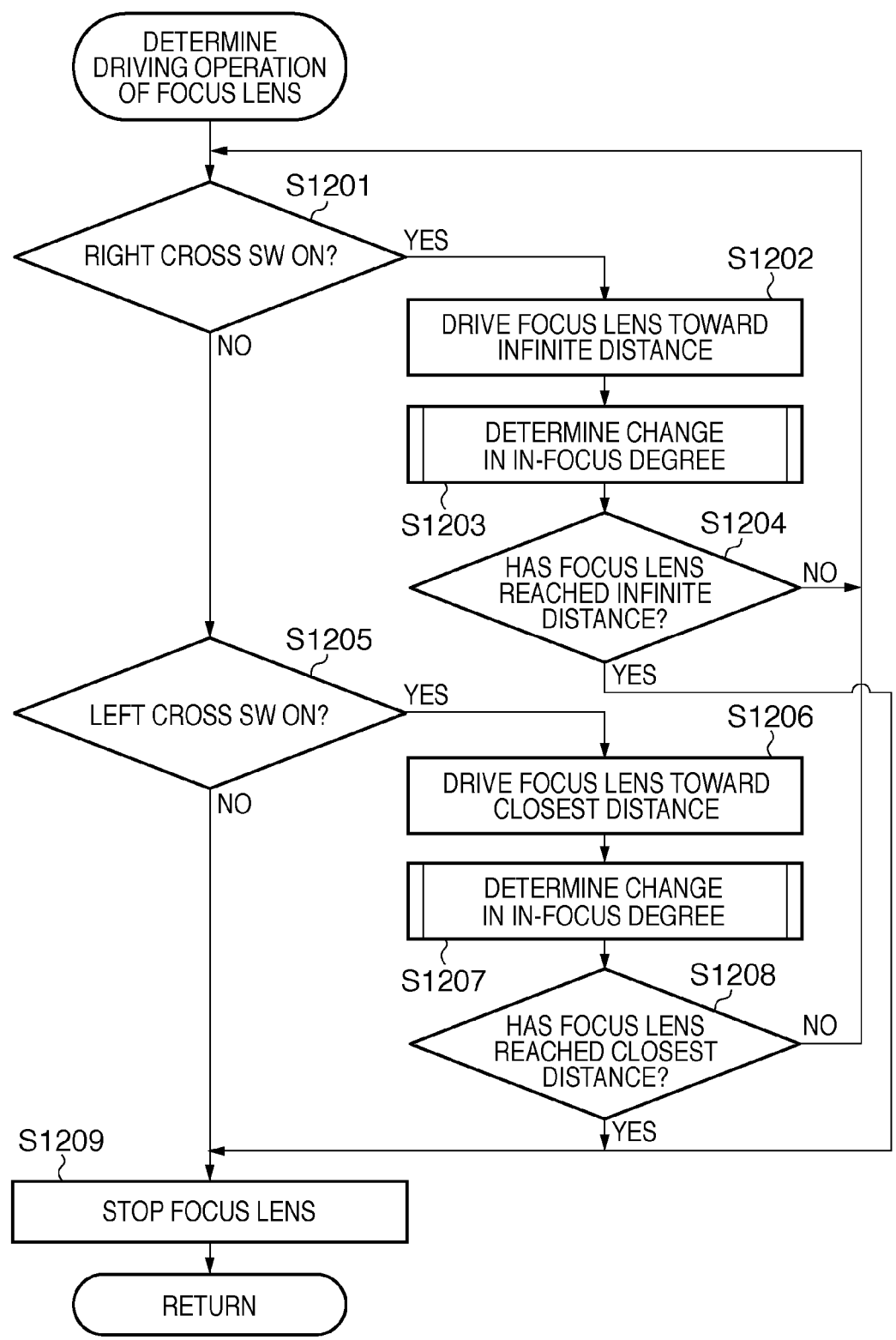
FIG. 13 is a flowchart showing processing for determining the driving operation of the focus lens according to a third embodiment of the present invention.

FIG. 13 is a substitute for the determination for the driving operation of the focus lens in FIG. 6 in the first embodiment. First, in step S1201, it is checked whether or not the right switch of the cross SW 130 is ON. If the right switch is ON, the processing proceeds to step S1202, or if not, the processing proceeds to step S1205. In step S1202, the focus lens 101 starts to be driven toward the infinite distance. The focus lens 101 is then kept moving toward the infinite distance until the processing for stopping the driving operation is subsequently requested. In step S1203, the determination of change in in-focus degree is carried out in accordance with a procedure described below. In step S1204, it is checked whether or not the focus lens 101 reaches the infinite distance. If the focus lens 101 reaches the infinite distance, the processing proceeds to step S1209, or if not, the processing is returned to step S1201.

In step S1205, it is checked whether or not the left switch of the cross SW 130 is ON, and if the left switch is ON, the processing proceeds to step S1206, or if not, the processing proceeds to step S1209. In step S1206, the focus lens 101 starts to be driven toward the closest distance. The focus lens 101 is then kept moving toward the closest distance until the processing for stopping the driving operation is subsequently requested. In step S1207, the determination of change in in-focus degree is carried out in accordance with a procedure described below. In step S1208, it is checked whether or not the focus lens 101 reaches the closest distance. If the focus lens 101 reaches the closest distance, the processing proceeds to step S1209, or if not, the processing is returned to step S1201.

In step S1209, the driving operation of the focus lens 101 is stopped.

Figure 14:
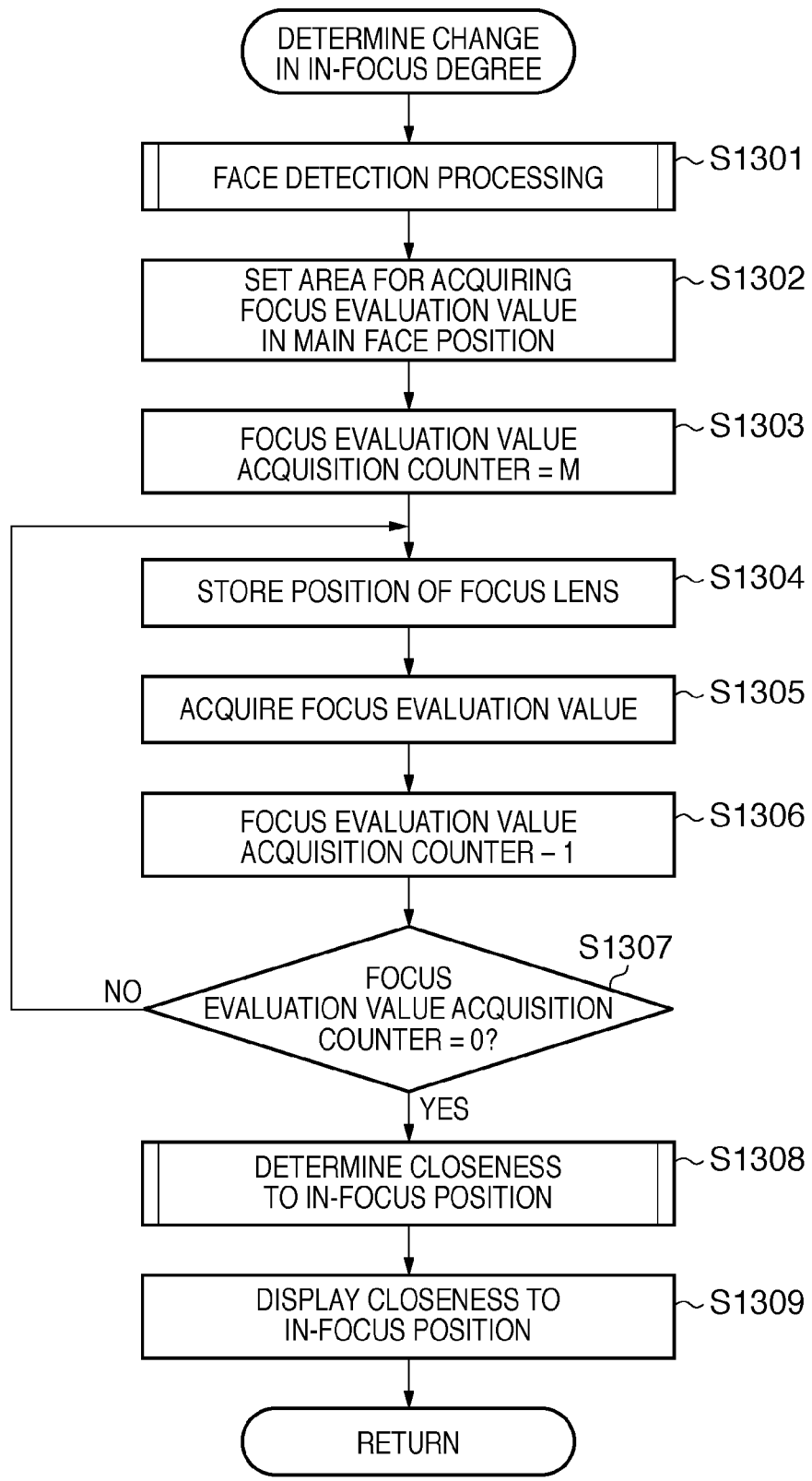
FIG. 14 is a flowchart showing processing for a determination of change in in-focus degree according to the third embodiment of the present invention.

FIG. 14 is a flowchart for explaining the determination of change in in-focus degree in step S1203 and step S1207 of FIG. 13. First, in step S1301, face detection processing is carried out in accordance with the procedure described with reference to FIG. 3 in the first embodiment. In step S1302, the area for acquiring the focus evaluation value is set in the position of the main face detected in step S1301.

In step S1303, the focus evaluation value acquisition counter is set at a predetermined value M, and the predetermined value M is stored in the work memory 126. Here, M is a positive integer. The focus evaluation value acquisition counter here is stored in the work memory 126, separately from the focus evaluation value acquisition counter set in step S407 of FIG. 5A in the first embodiment.

In step S1304, the current position of the focus lens 101 is acquired and stored in the work memory 126. In step S1305, the focus evaluation value for the current focus lens position is acquired and stored in the work memory 126. In step S1306, a value 1 is subtracted from the value of the focus evaluation value acquisition counter set in step S1303 and the value after the subtraction is stored in the work memory 126. In step S1307, it is determined whether or not the focus evaluation value acquisition counter reaches 0. If the counter indicates 0, the processing proceeds to step S1308, or if not, the processing is returned to step S1304.

In step S1308, the determination of closeness to the in-focus position is carried out in accordance with a procedure described below. In step S1309, the result of the determination in step S1308 is displayed on the EVF 128 in accordance with information on the determination of closeness to the in-focus position stored in the work memory 126.

FIG. 15 is a flowchart for explaining the determination of closeness to the in-focus position in step S1308 of FIG. 14. First, in step S1401, the relationship between the focus evaluation values acquired in step S1305 is checked in the positions of the focus lens 101 stored in step S1304 of FIG. 14. Then, if the focus evaluation values form a peak, the processing proceeds to step S1402, or if not, the processing proceeds to step S1403. In step S1402, the information on the determination of closeness to the in-focus position, displayed in step S1309 of FIG. 14, is stored as data indicating an "in-focus state" in the work memory 126.

Furthermore, if the focus evaluation values are increased in the driving direction (YES in step S1403), the processing proceeds to step S1404, or if not, the processing proceeds to step S1405. In step S1404, the information on the determination of closeness to the in-focus position, displayed in step S1309 of FIG. 14, is stored as data indicating the state of being "closer to the in-focus position" in the work memory 126.

Alternatively, if the focus evaluation value is decreased in the driving direction (YES in step S1405), the processing proceeds to step S1406, or if not, the processing proceeds to step S1407. In step S1406, the information on the determination of closeness to the in-focus position, displayed in step S1309 of FIG. 14, is stored as data indicating the state of being "away from the in-focus position" in the work memory 126. In step S1407, the determination of closeness to the in-focus position, displayed in step S1309 of FIG. 14, is stored as data indicating the state of "unknown" in the work memory 126.

Now, the relationship between the focus evaluation values and the information on the determination of closeness to the in-focus position will be described with reference to FIGS. 16A to 16D. Now, the focus evaluation value acquisition counter in step S1303 of FIG. 14 is assumed to be M=3. Then, three focus evaluation values are acquired by repeating the processing from step S1304 to step S1307. The positions of the focus lens 101 for acquiring the three focus evaluation values are denoted by P4, P5, and P6 in the order of acquisition.

The relationship between the focus evaluation values obtained in these positions P4 to P6 is of four types as shown in FIGS. 16A to 16D. In FIGS. 16A to 16D, the horizontal axis indicates the order of positions in the direction of driving the focus lens 101, whereas the vertical axis indicates the focus evaluation value.

Figure 16A:
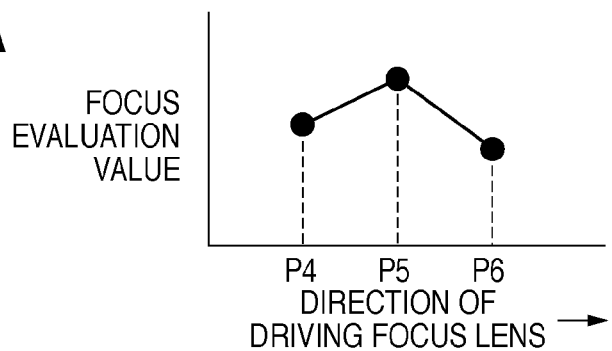
FIGS. 16A to 16D are diagrams for explaining a method for the determination of change in in-focus degree according to the third embodiment of the present invention.

First, in FIG. 16A, the focus evaluation value in the position P5 is the largest among the three focus evaluation values. In this case, it is determined that the focus lens 101 has already been brought into the in-focus position. Therefore, the determination of closeness to the in-focus position in this case indicates an in-focus state.

Figure 16B:
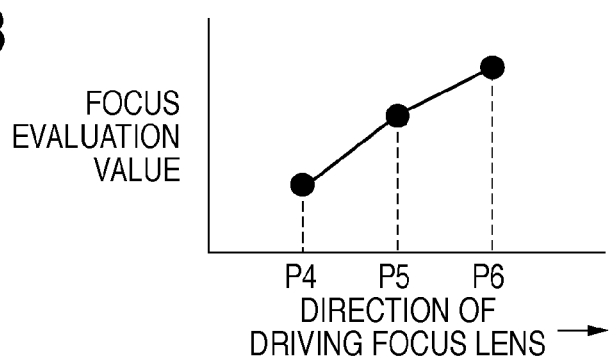

Next, in FIG. 16B, the focus evaluation value in the position P6 is the largest among the three focus evaluation values. In this case, the in-focus position is estimated farther in the direction of driving the focus lens 101 from the position P6. Therefore, the determination of closeness to the in-focus position in this case indicates the state of being closer to the in-focus position.

Figure 16C:
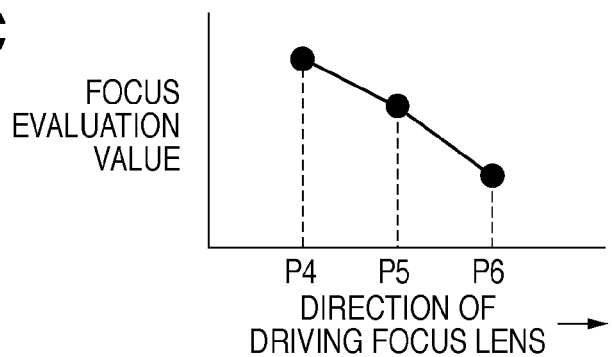

Next, in FIG. 16C, the focus evaluation value in the position P4 is the largest among the three focus evaluation values. In this case, the in-focus position is estimated farther in a direction opposite to the direction of driving the focus lens 101 from the position P4. Therefore, the determination of closeness to the in-focus position in this case indicates the state of being away from the in-focus position.

Figure 16D:
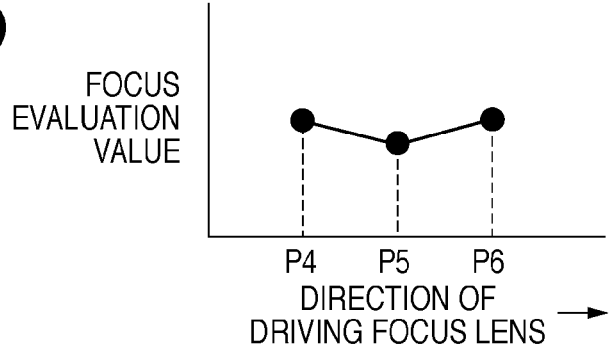

Next, in FIG. 16D, the focus evaluation value in the position P5 is the smallest among the three focus evaluation values. In this case, it is unknown if the in-focus position is to be directed toward the infinite distance or the closest distance. Therefore, the determination of closeness to the in-focus position in this case indicates the state of being unknown.

The in-focus direction determined as described above is displayed on the EVF 128 as described in step S1309 of FIG. 14. An example of how to display the in-focus direction in this case will be described with reference to FIGS. 17A to 17D.

FIGS. 17A to 17D show four types of diagrams, depending on the content of the determination of closeness to the in-focus position to be displayed, each displaying both or either one of a circular icon and triangle icons depending on the result of the determination of closeness to the in-focus position, with a quadrangular frame displayed as a focus frame in the position of a detected face.

Figure 17A:
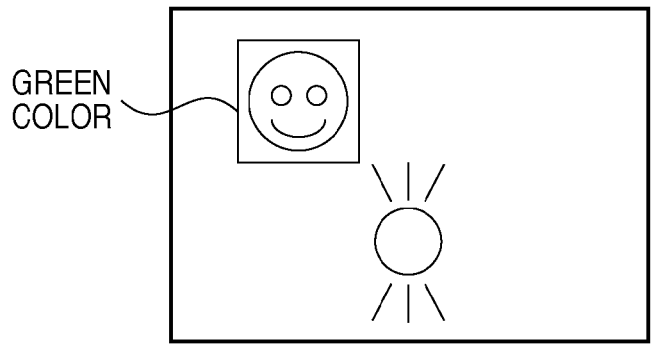
FIGS. 17A to 17D are diagrams illustrating an example of displaying the determination of change in in-focus degree according to the third embodiment of the present invention.

First, FIG. 17A is a diagram showing an in-focus state. In this case, the circular icon in the center is displayed in, for example, a white color, whereas none of the triangle icons is displayed. The focus frame in the face position is displayed in, for example, a green color.

Figure 17B:
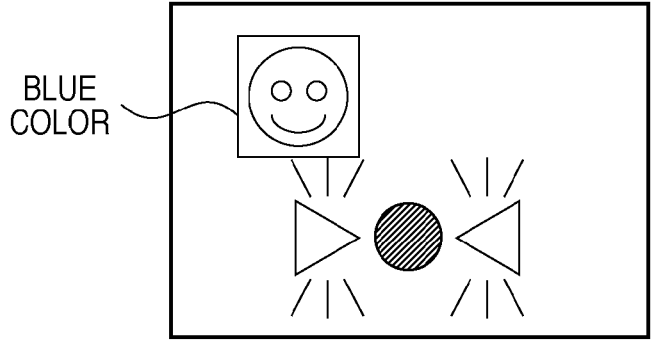

Next, FIG. 17B is a diagram showing a case of being closer to the in-focus position. In this case, the right and left triangle icons are facing toward the circular icon in the center, and displayed in, for example, a white color, whereas the circular icon in the center is displayed in, for example, a black color. The focus frame in the face position is displayed in, for example, a blue color.

Figure 17C:
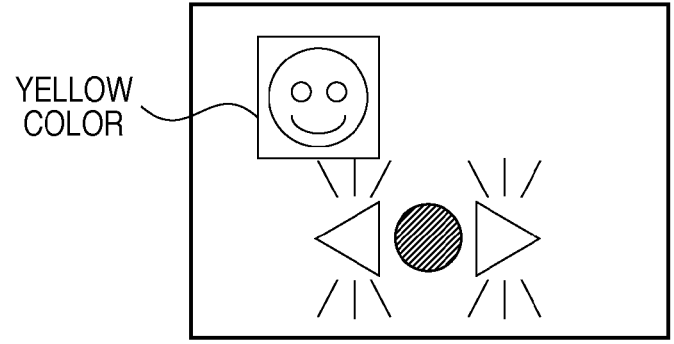

Next, FIG. 17C is a diagram showing a case of being away from the in-focus position. In this case, the right and left triangle icons are facing outward with respect to the circular icon in the center, and displayed in, for example, a white color, whereas the circular icon in the center is displayed in, for example, a black color. The focus frame in the face position is displayed in, for example, a yellow color.

Figure 17D:
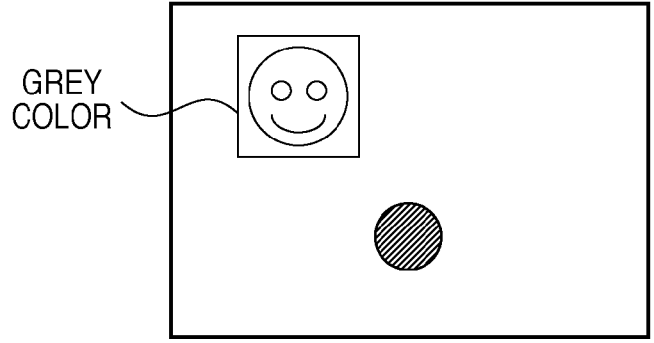

Next, FIG. 17D is a diagram showing the unknown. In this case, the circular icon in the center is displayed in a black color, whereas neither the right triangle nor the left triangle icons is displayed. The focus frame in the face position is displayed in, for example, a gray color.

As described above, the photographer is able to know whether the in-focus position of a detected face is closer to or away from with respect to the direction of driving the focus lens 101 operated. Therefore, the photographer is able to know the direction of driving the focus lens 101 closer to the in-focus position while carrying out the MF operation. Thus, even if the focus lens 101 is being driven in a direction opposite to the in-focus direction, the driving direction can be immediately corrected.

<Fourth Embodiment>

In the case of the configuration for determining the in-focus direction as described above, the photographer is able to know the difference between the position to which the focus lens 101 is driven and the actual in-focus position. The position of the focus lens 101 can be controlled by utilizing this difference. This method will be described below.

FIG. 18 is a diagram illustrating the relationship between the position of the focus lens 101 and the focus evaluation value in a case in which the focus evaluation value acquisition counter to be set is N=5 in step S407 of FIG. 5A described in the first embodiment. The positions of acquiring the focus evaluation value in this case are denoted by P7 to P11 from the infinite distance toward the closest distance. The focus evaluation values as shown in FIG. 18 are assumed to be obtained for these positions.

The position of the focus lens 101 driven by the photographer corresponds to the position P9. On the other hand, the position of the focus lens 101 which indicates the maximum value for the focus evaluation value corresponds to the position P10. Therefore, the position 10 is estimated to be the in-focus position. Thus, the focus lens 101 is driven to these positions corresponding to P9 and P10 to carry out image sensing. The image sensing procedure at this time is described below.

FIG. 19 is a substitution as image sensing processing in MF for the image sensing processing in FIG. 4 in the first embodiment. First, in step S1901, it is determined whether an image sensing mode for both positions is set, and if the mode is set, the processing proceeds to step S1902, or if not, the processing proceeds to step S1906. This image sensing mode for both positions refers to a mode in which image sensing is carried out in the both positions, the position of the focus lens 101 driven by photographer's operation and the actual in-focus position described with reference to FIG. 18. This mode can be set by assigning the image sensing mode for both positions to the mode switch 124 and operating the mode switch 124. In step S1902, the focus lens 101 is driven to a position of the focus lens 101 driven by the photographer's operation. This position corresponds to P9 in FIG. 18. In step S1903, the image sensing processing shown in FIG. 4 is carried out. In step S1904, the focus lens 101 is driven to the actual in-focus position. This position corresponds to P10 in FIG. 18. In step S1905, the image sensing processing described with reference to FIG. 4 is carried out.

In step S1906, it is determined whether or not the actual in-focus position is selected as the position of the focus lens 101 for image sensing. If the actual in-focus position is selected, the processing proceeds to step S1907, or if not, the processing proceeds step S1909. This is set by operating the setting switch 129. In step S1907, the focus lens 101 is driven to the actual in-focus position. This actual in-focus position corresponds to the position P10 in FIG. 18. In step S1908, the image sensing processing described with reference to FIG. 4 is carried out. In step S1909, the focus lens 101 is driven to a position of the focus lens 101 driven by the photographer's operation. This position corresponds to the position P9 in FIG. 18. In step S1910, the image sensing processing shown in FIG. 4 is carried out.

As described above, as for the position of the focus lens 101 for image sensing, both or either one of the position of the focus lens 101 driven by the photographer and the actual in-focus position can be selected. Therefore, both or either one can be selected as the position of the focus lens 101, of the position through the operation of the photographer himself, which reflects the photographer's intent, and the position based on the focus evaluation value, which is detected by the camera. This increases choices for image sensing, thereby allowing image sensing to be carried out in a wide variety of expressions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001825, filed on Jan. 7, 2009, which is hereby incorporated by reference herein in its entirety.

What is claimed is:

1. An image sensing apparatus comprising:
   an image sensing unit configured to obtain first image signals every set number of frames and second image signals in frames other than frames in which the first image signals are obtained;
   a control unit configured to control to drive a focus lens for the image sensing unit for obtaining the second image signals at different focus lens positions respectively;
   an acquisition unit configured to acquire from the second image focus evaluation values each indicating a focus state of an image;
   a determination unit configured to determine a driving direction of driving the focus lens for an in-focus state on the basis of the focus evaluation values, and
   a display unit configured to display images corresponding to the first image signals obtained by the image sensing unit and the determined driving direction.

2. The image sensing apparatus according to claim 1, wherein the display of the driving direction includes displays indicating a direction toward an infinite distance, a direction toward a closest distance, an in-focus state, and an unknown.

3. The image sensing apparatus according to claim 2, wherein a mode of display of the driving direction is changed depending on content of the display.

4. The image sensing apparatus according to claim 1, wherein an exposure period for the image sensor in the frames for the second image signals is shorter than an exposure period for the image sensor in the frames for the first image signals.

5. The image sensing apparatus according to claim 1, further comprising an operation unit configured to input a request to manually drive the focus lens,
   wherein the control unit controls to drive the focus lens on the basis of a request from the operation unit.

6. The image sensing apparatus according to claim 5, wherein the acquisition unit obtains a focus evaluation value from the second image signals in each frame obtained from the image sensing unit, while the control unit controls to drive the focus lens on the basis of a request from the operation unit, and
   the determination unit determines closeness to an in-focus state in the direction of driving the focus lens on the basis of the obtained focus evaluation values, and
   the display unit display the result of the determination.

7. The image sensing apparatus according to claim 5,
   wherein the determination unit determines an in-focus position of the focus lens on the basis of the focus evaluation values obtained by the acquisition unit; and
   the control unit sets both or either one of the determined in-focus position and a position in which driving the focus lens is stopped.

8. A control method for an image sensing apparatus comprising an image sensing unit, and a display unit configured to display image signals, the control method comprising:
   obtaining first image signals every set number of frames and second image signals in frames other than frames in which the first image signals are obtained by the image sensing unit, wherein a focus lens is driven so that the image sensing unit obtains the second image signals at different focus lens positions respectively;
   acquiring from the second image signals focus evaluation values each indicating a focus state of an image;
   determining a driving direction of driving the focus lens for an in-focus state on the basis of the obtained focus evaluation values; and
   displaying images corresponding to the first image signals obtained by the image sensing unit and the determined driving direction.

9. An image sensing apparatus comprising:
   an image sensing unit configured to obtain first images with a focus lens at a preset position and second images between the first images with the focus lens at different positions;
   a control unit configured to control to drive the focus lens for image sensing by the image sensing unit;
   an acquisition unit configured to acquire from image signals of the second images focus evaluation values each indicating a focus state of an image;
   a determination unit configured to determine a driving direction of driving the focus lens for an in-focus state on the basis of the focus evaluation values, and
   a display unit configured to display the first images obtained by the image sensing unit and the determined driving direction.

10. A control method for an image sensing apparatus comprising an image sensing unit, and a display unit configured to display image signals, the control method comprising:
    obtaining first images with a focus lens at a preset position and second images between the first images with the focus lens at different positions;
    acquiring from image signals of the second images focus evaluation values each indicating a focus state of an image;
    determining a driving direction of driving the focus lens for an in-focus state on the basis of the obtained focus evaluation values; and displaying the first images obtained by the image sensing unit and the determined driving direction.

11. An image sensing apparatus comprising:
an image sensing unit configured to obtain an image;
an operation unit configured to input a request to manually drive a focus lens;
a control unit configured to control to drive the focus lens for image sensing by the image sensing unit on the basis of a request from the operation unit;
a determination unit configured to determine closeness to an in-focus state in a direction of driving the focus lens on the basis of focus evaluation values acquired from image signals while the control unit controls to drive the focus lens for image sensing by the image sensing unit on the basis of a request from the operation unit; and
a display unit configured to display an image obtained by the image sensing unit and the result of the determination.

12. The image sensing apparatus according to claim 11, wherein the image sensing unit obtains first images for displaying by the display unit and second images other than the first images for acquiring the focus evaluation values.

13. A control method for an image sensing apparatus comprising an image sensing unit, and a display unit configured to display an image, the control method comprising:
inputting a request to manually drive a focus lens;
controlling to drive the focus lens for image sensing by the image sensing unit on the basis of the input request;
determining closeness to an in-focus state in a direction of driving the focus lens on the basis of focus evaluation values acquired from images while controlling to drive the focus lens for image sensing by the image sensing unit on the basis of the input request; and
displaying an image obtained by the image sensing unit and the result of the determination.

14. The control method according to claim 13, wherein the image sensing unit obtains first images for displaying by the display unit and second images other than the first images for acquiring the focus evaluation values.

* * * * *